US012118782B2

(12) United States Patent
Kikuchi et al.

(10) Patent No.: US 12,118,782 B2
(45) Date of Patent: Oct. 15, 2024

(54) FOREST RESOURCE INFORMATION GENERATION STRUCTURE AND FOREST RESOURCE INFORMATION GENERATION METHOD

(71) Applicant: KOUWA Co., Ltd., Hachinohe (JP)

(72) Inventors: Motoyoshi Kikuchi, Hachinohe (JP); Kou Onoda, Hachinohe (JP); Yuka Kawamata, Hachinohe (JP); Koki Kimura, Hiranai (JP); Satoshi Tsuchiya, Hiranai (JP)

(73) Assignee: KOUWA CO., LTD., Hachinohe (JP)

( * ) Notice: Subject to any disclaimer, the term of this patent is extended or adjusted under 35 U.S.C. 154(b) by 419 days.

(21) Appl. No.: 17/499,140

(22) Filed: Oct. 12, 2021

(65) Prior Publication Data

US 2022/0114810 A1    Apr. 14, 2022

(30) Foreign Application Priority Data

Oct. 14, 2020 (JP) .................................. 2020-173364

(51) Int. Cl.
  *G06V 20/10* (2022.01)
  *B64C 39/02* (2023.01)
  (Continued)

(52) U.S. Cl.
  CPC .......... *G06V 20/188* (2022.01); *B64C 39/024* (2013.01); *G01S 17/89* (2013.01); *G06T 7/62* (2017.01); *B64U 2101/30* (2023.01)

(58) Field of Classification Search
  CPC ....... G06V 20/188; G06T 7/62; B64C 39/024; G01S 17/89; B64U 2101/30
  See application file for complete search history.

(56) References Cited

U.S. PATENT DOCUMENTS

2020/0225075 A1\* 7/2020 Shao .................... G01S 13/865

FOREIGN PATENT DOCUMENTS

JP    2006-285310 A    10/2006
JP    2010-96752 A     4/2010
(Continued)

OTHER PUBLICATIONS

Yang, B.; Dai, W.; Dong, Z.; Liu, Y. Automatic Forest Mapping at Individual Tree Levels from Terrestrial Laser Scanning Point Clouds with a Hierarchical Minimum Cut Method. Remote Sens. 2016, 8, 372. https://doi.org/10.3390/rs8050372 (Year: 2016).*

*Primary Examiner* — Utpal D Shah

(74) *Attorney, Agent, or Firm* — Lippes Mathias LLP

(57) ABSTRACT

A forest resource information generation structure and a forest resource information generation method enable more efficiently grasping forest resource information via direct measurement of a breast height diameter with no need for an actual measurement data collection process such as a ground survey are provided. A forest resource information generation structure 100 is a structure for generating forest resource information using point cloud data D00 of forest resources, the point cloud data D00 being acquired via a remote sensing technique, and includes a tree top detection processing section 10 for obtaining tree top information D10 and a breast height diameter calculation processing section 35 for obtaining breast height diameter information D35, and further includes a tree trunk detection processing section 30 for obtaining breast height part information D30 based on terrain height information obtained from the point cloud data D00 and the tree top information D10, and the breast height diameter information D35 is generated by the breast height part information D30 being subjected to processing in the breast height diameter calculation processing section 35.

28 Claims, 31 Drawing Sheets

(51) Int. Cl.
  *B64U 101/30*  (2023.01)
  *G01S 17/89*  (2020.01)
  *G06T 7/62*  (2017.01)

(56) References Cited

FOREIGN PATENT DOCUMENTS

| JP | 2013-088188 A | | 5/2013 | |
|----|---------------|---|--------|---|
| WO | WO-2010032495 A1 | * | 3/2010 | ............ A01G 23/00 |
| WO | WO-2019198412 A1 | * | 10/2019 | |
| WO | WO-2020109666 A1 | * | 6/2020 | |

* cited by examiner

■ CEDAR TREE VOLUME EQUATION

| DIAMETER RANGE (cm) | TREE VOLUME EQUATION |
|---|---|
| 4~10 | $\log v = \overline{5}.823858 + 1.930072 \log d + 0.890582 \log h$ |
| 12~20 | $\log v = \overline{5}.729796 + 1.933985 \log d + 0.974995 \log h$ |
| 22~40 | $\log v = \overline{5}.794481 + 1.778137 \log d + 1.086571 \log h$ |
| 42 OR MORE | $\log v = \overline{4}.145934 + 1.616131 \log d + 1.086571 \log h$ | v: TREE VOLUME   d: BREAST HEIGHT DIAMETER   h: TREE HEIGHT

CHANGE OF DETECTION RANGE WHERE THERE VALLEY BETWEEN HIGHEST POINTS

DELETION BASED ON NEIGHBOR POINTS AND TOP ANGLE

ACQUISITION OF THREE NEIGHBOR POINTS OF TERRAIN PART

CALCULATION OF TERRAIN HEIGHT AND CALCULATION OF TREE HEIGHT

FOREST POINT CLOUD DATA AND TREE TOP DETECTION POSITIONS

TERRAIN POINT CLOUD DATA AND DETECTION OF TREE TRUNK PARTS AT AROUND BREAST HEIGHT

CALCULATION OF TREE DIAMETER

WHERE O VIRTUAL CENTER POINT
AND RADIUS r = OD = OA, $$(r - CD)^2 + AC^2 = r^2$$

$$\therefore r = \frac{CD^2 + AC^2}{2CD}$$

RE-DETERMINATION AFTER NOISE REMOVAL

RELIABILITY HIGH

RELIABILITY LOW

NO RELIABILITY

RESOLUTION BASED HIGHEST POINT AND DETECTION OF END POINT

Fig. 37

CORRECTION OF PROJECTING POINT AND REMOVAL OF EXTREME DEPRESSION

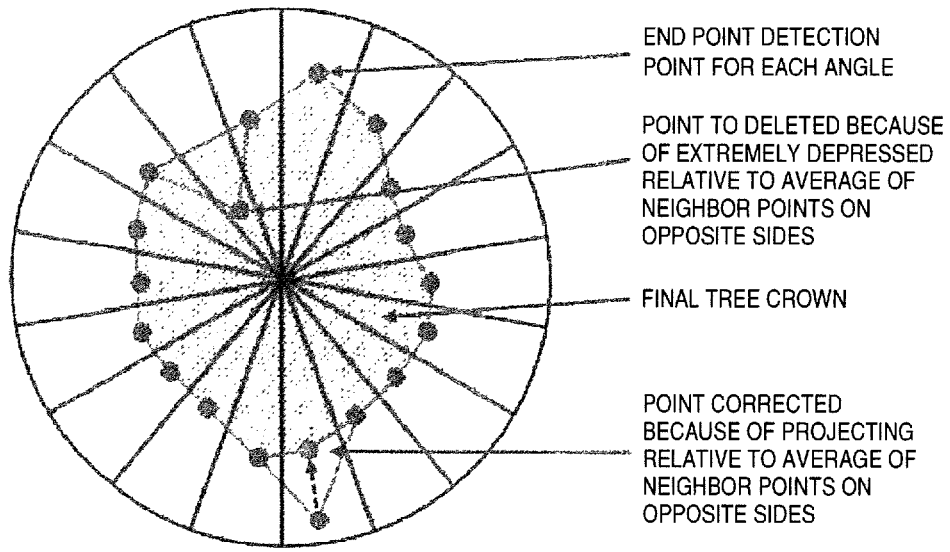

END POINT DETECTION POINT FOR EACH ANGLE

POINT TO DELETED BECAUSE OF EXTREMELY DEPRESSED RELATIVE TO AVERAGE OF NEIGHBOR POINTS ON OPPOSITE SIDES

FINAL TREE CROWN

POINT CORRECTED BECAUSE OF PROJECTING RELATIVE TO AVERAGE OF NEIGHBOR POINTS ON OPPOSITE SIDES

Fig. 38

VORONOI DIAGRAM (WHITE LINES)

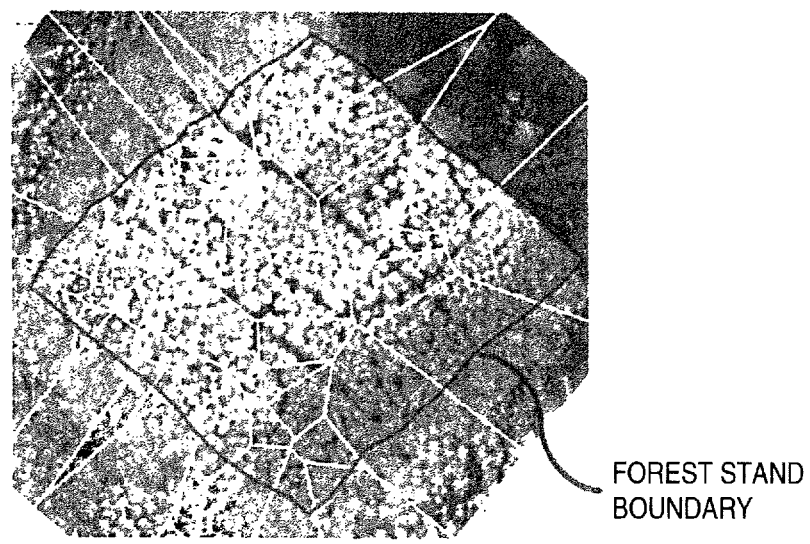

FOREST STAND BOUNDARY

EACH OPEN CIRCLE INDICATES DATA WITH HIGH BREAST HEIGHT DIAMETER RELIABILITY

CLUSTERING OF VORONOI CELLS OF VORONOI DIAGRAM

MEASUREMENT OF COUNT OF STANDING TREES WITHIN 5 m-RADIUS

Fig. 41

SINGLE TREE DATA ITEM LIST

| INDIVIDUAL NUMBER | X COORDINATE | Y COORDINATE NUMBER | TREE HEIGHT | BREAST HEIGHT DIAMETER | TREE CROWN PROJECTED AREA | TREE CROWN DIAMETER | TREE CROWN LENGTH | TREE CROWN LENGTH RATIO | BREAST HEIGHT DIAMETER ACCURACY | CLUSTER NUMBER | ESTIMATED BREAST HEIGHT DIAMETER |
|---|---|---|---|---|---|---|---|---|---|---|---|
| | | | | | | | | | | | |
| | | | | | | | | | | | |

HIERARCHICAL CLUSTERING TREE DIAGRAMS (ILLUSTRATING Cid1, Cid2 AND Cid3 FROM LEFT)

FOREST RESOURCE INFORMATION GENERATION STRUCTURE AND FOREST RESOURCE INFORMATION GENERATION METHOD

CROSS-REFERENCE TO RELATED APPLICATION

This application claims priority under 35 USC 119 to Japanese patent application 2020-173364 filed Oct. 14, 2020, and the entire disclosure of said Japanese application is hereby expressly incorporated by reference into the present specification.

BACKGROUND OF THE INVENTION

Field of the Invention

The present invention relates to a forest resource information generation structure and a forest resource information generation method and specifically relates to a technique for grasping information of resources in a forest area using an unmanned aerial vehicle (UAV or drone)-mounted laser scanner.

Description of the Related Art

In recent years, it has been a practice to calculate forest resource information on a tree-by-tree basis based on laser measurement data obtained by applying laser light to a forest area under research from above. When a tree volume, which is important forest resource information, is calculated, it is generally calculated from a tree volume equation with two variables: a tree height and a breast height diameter of each tree. However, the breast height diameter cannot be measured from laser measurement data from an aircraft. Therefore, the breast height diameter is estimated based on actual measurement data obtained by, for example, a ground survey.

For techniques for calculating and grasping forest resource information, many technical proposals have been made in the past. For example, Japanese Patent Laid-Open No. 2006-285310 discloses a forest tree crown evaluation method and program for detecting a tree crown shape from a high-resolution satellite photograph of a forest and correctly determining a tree species of the tree crown, in which spatial variation in luminance value of data of an image taken of a forest from above is subjected to flattening processing for flattening a crest part and a valley part with no substantial change of luminance variation in boundary part of a tree crown, the flattened spatial variation in luminance value of the image data is subjected to area segmentation processing to figure out a shape of the tree crown and a texture feature value of the image data of the tree crown is calculated and then is compared with a reference texture feature value according to tree crown image data of known tree species to determine a tree species of the tree crown.

Also, Japanese Patent Laid-Open No. 2010-96752 discloses, as a tree information measurement method that enables acquiring highly accurate tree information with less effort, a method including: a step of causing distance data acquisition means to measure distance data of a distance to an arbitrary part of a measurement target object at a plurality of spots; a step of causing feature data extraction means to extract a feature data group corresponding to a trunk of a tree from the distance data; a step of causing matching means to match the distance data for the plurality of spots with each other via scan matching and specifying the distance data in a three-dimensional coordinate system; a step of causing single tree extraction means to extract a single tree from coordinate point data specified in three-dimensional coordinate system; and a step of causing tree information detection means to detect tree information such as a tree height, a tree trunk diameter and a tree crown length on a single tree-by-single tree basis. Note that scan matching is a technique that performs detection of overlaps (detection of differences) between mutually different data sets for use in processing such as substitution or replacement between the data sets.

As stated above, conventionally, a breast height diameter necessary for calculating a tree volume, which is important forest resource information, cannot be measured using laser measurement data from an aircraft, and thus, needs to be estimated based on actual measurement data obtained by, for example, a ground survey.

However, collection of actual measurement data via a ground survey or the like requires a huge amount of time and effort. There is a need for a technique that enables more efficiently obtaining forest resource information with no need for such process.

Therefore, in view of the aforementioned problem in the related art, an object of the present invention is to provide a forest resource information generation structure and a forest resource information generation method that enables more efficiently grasping forest resource information via direct measurement of a breast height diameter with no need for an actual measurement data collection process such as a ground survey.

SUMMARY OF THE INVENTION

As a result of a diligent study on the above object, the present inventor has made a certain achievement. In other words, the present inventor studied on an elevation and an angle that enable capturing a tree crown shape using, for example, a UAV-mounted laser scanner and successfully extracted a top of a tree from obtained three-dimensional point cloud data and acquired a point cloud in a part at around a breast height of a trunk of the tree within a fixed range with the top of the tree as a center and thus measured a breast height diameter from a planar distribution of the point cloud. Then, the present inventor succeeded in efficiently calculating forest resource information of an entire forest stand by creating an estimation equation using data of some individuals, the breast height diameters of which had been measured with good accuracy, and based on the result of the study, has completed the present invention. In other words, the invention claimed in the present application in order to achieve the above object or the invention at least disposed in the present application is as follows.

[1] A forest resource information generation structure for generating forest resource information using point cloud data of forest resources, the point cloud data being acquired via a remote sensing technique, the structure including a tree top detection processing section for obtaining tree top information and a breast height diameter calculation processing section for obtaining breast height diameter information, the structure further including a tree trunk detection processing section for obtaining breast height part information based on terrain height information obtained from the point cloud data and the tree top information, wherein the breast height diameter information is generated by the breast height part information being subjected to processing in the breast height diameter calculation processing section.

[2] The forest resource information generation structure according to [1], wherein in the tree trunk detection processing section, a detection range with the tree top information as a center is set, and in the detection range, a point cloud in a part at around a breast height with the terrain height information reflected is acquired as the breast height part information.

[3] The forest resource information generation structure according to [2], wherein in the breast height diameter calculation processing section, a substantially arc or substantially circular two-dimensional distribution with a Z-coordinate removed from the acquired breast height part information is created, and the breast height diameter information is generated by a radius of the two-dimensional distribution being calculated according to a predetermined method.

[4] The forest resource information generation structure according to [3], wherein the calculation according to the predetermined method is calculation according to properties of chords and Pythagorean's theorem.

[5] The forest resource information generation structure according to any of [1], [2], [3] and [4], wherein in the tree top detection processing section, the tree top information is obtained from the point cloud data using a planar structure in which units of the detection range, the units having a same shape and a same size (hereinafter referred to as "mesh element(s)"), are consecutively provided (hereinafter referred to as "mesh structure") and for each mesh element, processing for determining highest point data of a highest point converged through repetition of <A1> and <A2> below, as the tree top information is performed:

<A1> extract highest point data whose Z-coordinate is largest in the mesh element; and <A2> re-set a detection range having a size that is same as that of the mesh element, with X and Y coordinates of the highest point data as a center.

[6] The forest resource information generation structure according to [5], wherein in the tree top detection processing section, for the tree top information for each mesh element, processing for removing data whose Z-coordinate is smaller, the data being present around the tree top information, according to a predetermined criterion based on an estimated value of a tree crown diameter (hereinafter referred to as "estimated tree crown diameter") is performed.

[7] The forest resource information generation structure according to [6], wherein the predetermined criterion includes <B1> and <B2> below:

<B1> within the estimated tree crown diameter, delete data whose Z-coordinate is smaller than that of the tree top information; and <B2> within a range that is double the estimated tree crown diameter, delete data present within a top angle estimated from a tree species.

[8] The forest resource information generation structure according to any of [5], [6] and [7], wherein in the tree top detection processing section, during the repetition of <A1> and <A2>, if there is data whose Z-coordinate has a local minimal value (hereinafter referred to as "valley") between the highest point data before and after the re-setting of the detection range, processing for sectioning the re-set detection range by the valley is performed.

[9] The forest resource information generation structure according to any of [1], [2], [3], [4], [5], [6], [7] and [8], including a tree height calculation processing section for obtaining the terrain height information from a lowermost layer data of the point cloud data and obtaining tree height information from the terrain height information and the tree top information.

[10] The forest resource information generation structure according to [9], wherein in the tree height calculation processing section, a TIN (triangulated irregular network) including X, Y coordinates of the tree top information is created from three points data neighboring the tree top information to obtain the terrain height information, and the tree height information is generated by subtraction of the terrain height information from a Z-coordinate of the tree top information.

[11] The forest resource information generation structure according to any of [1], [2], [3], [4], [5], [6], [7], [8], [9] and [10], including a breast height diameter reliability addition processing section (hereinafter simply referred to as "reliability addition processing section") for evaluating reliability of the breast height diameter information generated in the breast height diameter calculation processing section, wherein in the reliability addition processing section, reliability information for evaluation of whether or not the breast height diameter information has reliability, the reliability information being determined according to comparison between the breast height part information in a two-dimensional form and the breast height diameter information generated by the breast height diameter calculation processing section, is added to the breast height diameter information.

[12] The forest resource information generation structure according to any of [1], [2], [3], [4], [5], [6], [7], [8], [9], [10] and [11], including a tree crown information calculation processing section for obtaining tree crown projected area information and other tree crown information, wherein in the tree crown information calculation processing section, processing for extracting a data group for specifying a tree crown with the tree top as a center (hereinafter referred to as "tree crown detection target data group") from the point cloud data, dividing the data group by a predetermined angle into circumferential angular sectors (hereinafter referred to as "angular sector(s)"), specifying a point estimated as an outermost edge (hereinafter referred to as "end point") of the tree crown in each angular sector and connecting the respective end points to determine an outer circumference of the tree crown is performed.

[13] The forest resource information generation structure according to [12], wherein in the tree crown information calculation processing section, processing for dividing each angular sector in a centrifugal direction with a predetermined resolution into radial sectors (hereinafter referred to as "resolution sub-sector(s)") and connecting highest point data specified in the respective resolution sub-sectors to draw a schematic figure of a side contour of the tree crown and specifying the end point based on a degree of an inclination of a line segment included in the figure is performed.

[14] The forest resource information generation structure according to [13], wherein the specification of the end point is performed by any of <C1> to <C3> below:

<C1> if the inclination is smaller than a predetermined angle indicating smoothness through a predetermined number of consecutive line segments, determine a point immediately preceding the line segments as an end point;

<C2> if a sign of the inclination is inverse through a predetermined number of consecutive line segments, determine a point immediately preceding the line segments as an end point; and <C3> if there is no point in the resolution sub-sector, determine a point detected last as an end point.

[15] The forest resource information generation structure according to any of [12], [13] and [14], wherein if there is a tree top (hereinafter referred to as "other tree top") other than a processing target tree top (hereinafter referred to as "relevant tree top") in the tree crown detection target data group, processing for determining a boundary between tree crowns according to tree heights of the tree tops is performed.

[16] The forest resource information generation structure according to any of [12], [13], [14] and [15], wherein processing for correcting the end point for specifying the tree crown using a horizontal distance from the tree top to the end point (hereinafter referred to as "end point distance") is performed and the correction is correction in which the end point distance for the correction target end point is increased or decreased based on respective end point distances for two points neighboring the correction target on opposite sides.

[17] The forest resource information generation structure according to any of [1], [2], [3], [4], [5], [6], [7], [8], [9], [10], [11], [12], [13], [14], [15] and [16], including a tree volume calculation processing section for calculating tree volume information based on the breast height diameter information.

[18] The forest resource information generation structure according to any of [1], [2], [3], [4], [5], [6], [7], [8], [9], [10], [11], [12], [13], [14], [15], [16] and [17], including a breast height diameter reliability addition processing section (reliability addition processing section) that performs <D1> below in order to evaluate reliability of the breast height diameter information, and a breast height diameter estimation processing section that, for breast height diameter information having no reliability or low reliability, generating estimated breast height diameter information by estimating a breast height diameter based on information generated in the forest resource information generation structure (hereinafter referred to as "generated forest resource information"), <D1> addition of the reliability information for evaluation of whether or not the breast height diameter information has reliability, the reliability information being determined according to comparison between the breast height part information in a two-dimensional form and the breast height diameter information generated in the breast height diameter calculation processing section, to the breast height diameter information.

[19] The forest resource information generation structure according to [18], including a tree volume calculation processing section for calculating tree volume information based on the breast height diameter information or the estimated breast height diameter information.

[20] The forest resource information generation structure according to [18] or [19], wherein processing in the breast height diameter estimation processing section is performed using an information set including the generated forest resource information (hereinafter referred to "single tree data set for estimation equation creation") and in the single tree data set for estimation equation creation, cluster numbers generated by Voronoi cells of a Voronoi diagram covering a target forest stand being subjected to clustering processing are spatially joined to the single tree data, and the forest resource information generation structure includes a Voronoi diagram creation processing section that creates the Voronoi diagram and a clustering processing section that performs the clustering processing.

[21] The forest resource information generation structure according to [20], wherein a layer of the Voronoi diagram includes information of an inclination and a curvature, the information being created from a digital terrain model (hereinafter referred to as "DTM") obtained based on the point cloud data, and the forest resource information generation structure includes an inclination and other calculation processing section for calculating the inclination and the curvature.

[22] The forest resource information generation structure according to any of [1], [2], [3], [4], [5], [6], [7], [8], [9], [10], [11], [12], [13], [14], [15], [16], [17], [18], [19], [20] and [21], wherein the point cloud data is acquired via a remote sensing technique for any of <E1>, <E2> and <E3> below:

<E1> acquisition via a measurement technique using a UAV (unmanned aerial vehicle or drone)-mounted laser scanner (hereinafter referred to as "UAV laser");

<E2> acquisition via a UAV laser and a measurement technique using a ground laser scanner (hereinafter referred to as "ground laser"); and <E3> creation from an SfM multi-viewpoint stereoscopic photograph using a UAV and acquisition via a ground laser.

[23] The forest resource information generation structure according to any of [1], [2], [3], [4], [5], [6], [7], [8], [9], [10], [11], [12], [13], [14], [15], [16], [17], [18], [19], [20], [21] and [22], wherein the forest resource information generation structure takes a form of an apparatus.

[24] The forest resource information generation structure according to any of [1], [2], [3], [4], [5], [6], [7], [8], [9], [10], [11], [12], [13], [14], [15], [16], [17], [18], [19], [20], [21] and [22], wherein the forest resource information generation structure takes a form of a system including a data acquisition section for acquiring the point cloud data and is a forest resource information generation system.

[25] The forest resource information generation structure according to any of [1], [2], [3], [4], [5], [6], [7], [8], [9], [10], [11], [12], [13], [14], [15], [16], [17], [18], [19], [20], [21] and [22], wherein the forest resource information generation structure takes a form of a computer program and is a forest resource information generation program, and the respective processing sections included in the forest resource information generation program are steps for generating forest resource information, and the forest resource information generation program makes a computer execute the steps.

[26] A forest resource information generation method for generating forest resource information via the forest resource information generation structure according to any of [1], [2], [3], [4], [5], [6], [7], [8], [9], [10], [11], [12], [13], [14], [15], [16], [17], [18], [19], [20], [21], [22], [23], [24] and [25], the method including making the respective processing sections included in the forest resource information generation structure operate simultaneously or in an appropriate order.

[27] The forest resource information generation method according to [26], wherein a breast height diameter reliability addition processing section (reliability addition processing section) for evaluating reliability of breast height diameter information generated by the breast height diameter calculation processing section is included in the forest resource information generation structure, and in the reliability addition processing section, where reliability information for evaluation of reliability of breast height diameter information generated by the breast height diameter calculation processing section, the reliability information being determined according to comparison between the breast height part information in a two-dimensional form and the breast height diameter information, is added to the breast height diameter information, the comparison is made visually.

[28] The forest resource information generation method according to [27], wherein a noise removal step of removing data in a point cloud, the data being determined as noise based on the comparison made visually, is provided, and a step of tree trunk detection processing is performed again based on the data group subjected to the noise removal.

[29] The forest resource information generation method according to any of [26], [27] and [28], wherein the point cloud data is acquired by making an UAV fly at a height above ground level of no less than 40 m but no more than 100 m.

[30] The forest resource information generation method according to any of [26], [27], [28] and [29], wherein the point cloud data is acquired by a UAV laser with an irradiation angle of no more than ±60°.

With conventional laser measurement from an aircraft, it is impossible to directly measure a tree trunk. However, a tree trunk was successfully captured by making a UAV-mounted layer scanner fly at a predetermined height above ground level and using data of a predetermined irradiation angle range. Then, a diameter in a part at around a breast height was measured by deleting Z-coordinates from an obtained point cloud of the tree trunk and thereby creating a two-dimensional circular or arc distribution. Furthermore, breast height diameters in an entire forest stand were successfully estimated by, based on data of individuals, the breast height diameters of which had been measured with good accuracy, creating an estimation equation for a breast height diameter using, for example, a generalized linear mixed model. The present invention has been completed through the above study process.

The forest resource information generation structure and the forest resource information generation method of the present invention are configured as stated above and thus enable directly measuring a tree trunk and a breast height diameter with no need for an actual measurement data collection process such as a ground survey. Then, it is possible to efficiently and accurately grasp breast height diameters in an entire forest stand by creating an estimation equation based on data of individuals measured with good accuracy.

Also, the forest resource information generation structure and the forest resource information generation method of the present invention enables, based on a point cloud data set obtained with no need for an actual measurement data collection process, generating and acquiring various forest resource information pieces including a breast height diameter necessary for calculation of a tree volume, which is important information, as single tree data, and further, as information of an entire forest stand, efficiently and accurately relative to the conventional techniques.

BRIEF DESCRIPTION OF THE DRAWINGS

FIG. 11-2 is a table indicating example known tree volume equations;

FIGS. 19A and B illustrate a forest resource information generation method using a forest resource information generation structure of the present invention including all components (respective processing sections), wherein FIG. 19A is a first part of a flow chart and FIG. 19B is a second part of the flow chart;

(The below drawings relate to an embodiment)

Figure 20:
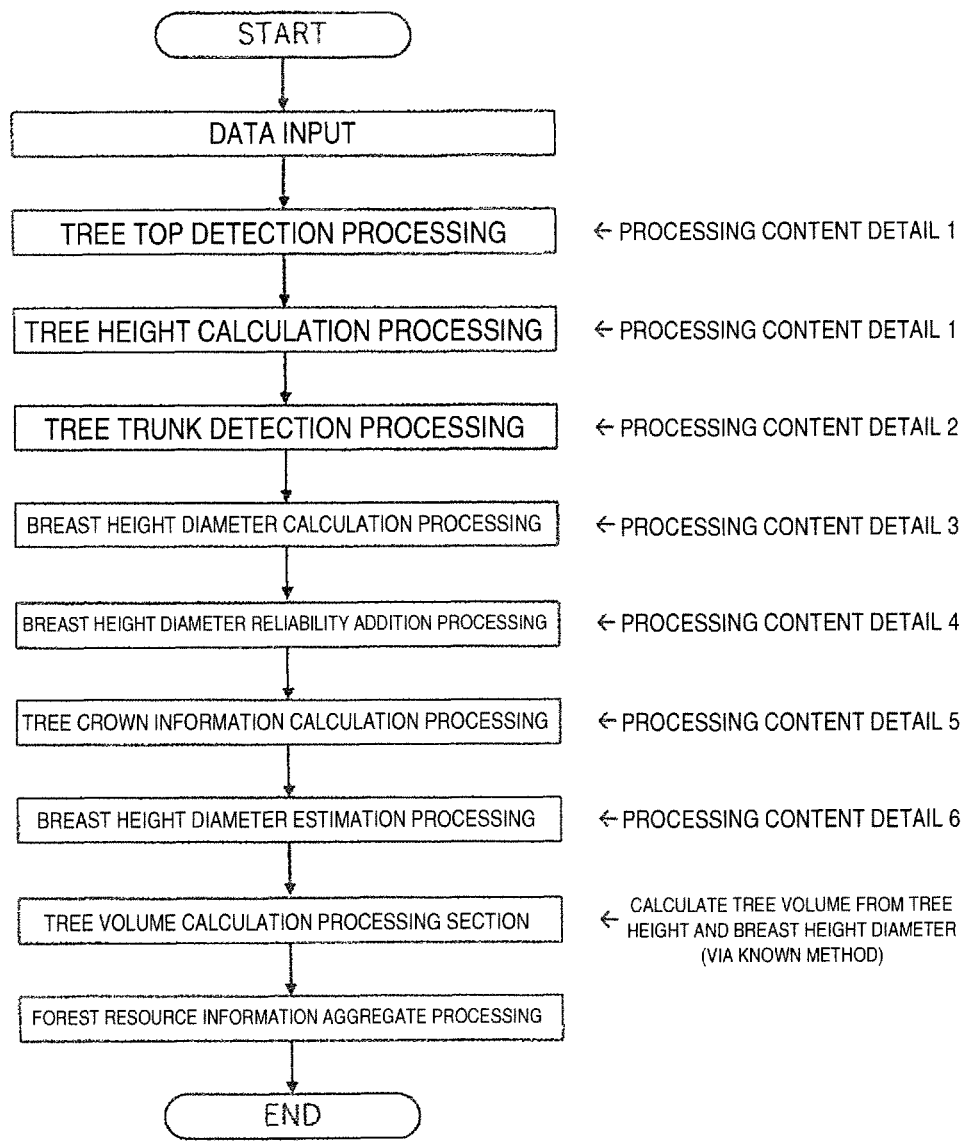
Figure 21:
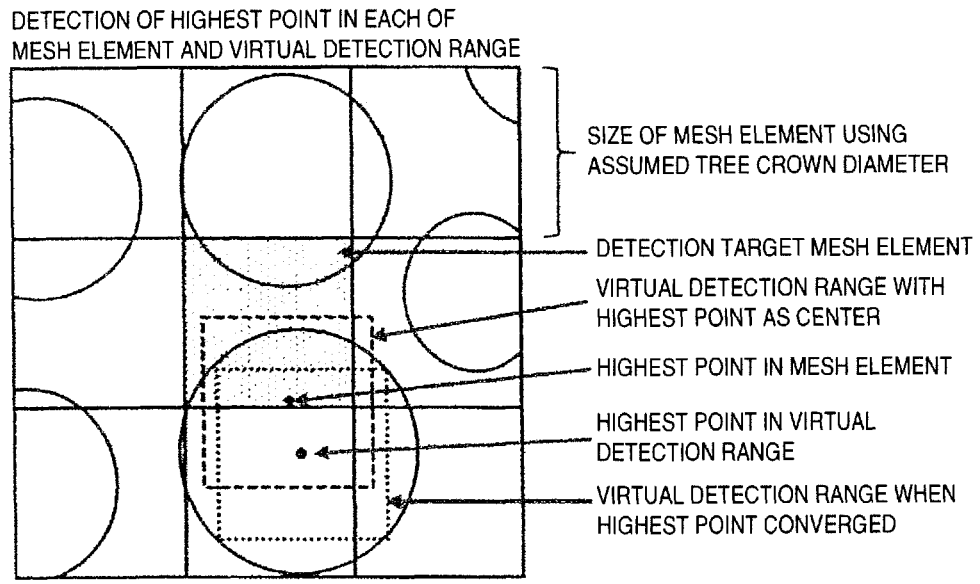
Figure 22:
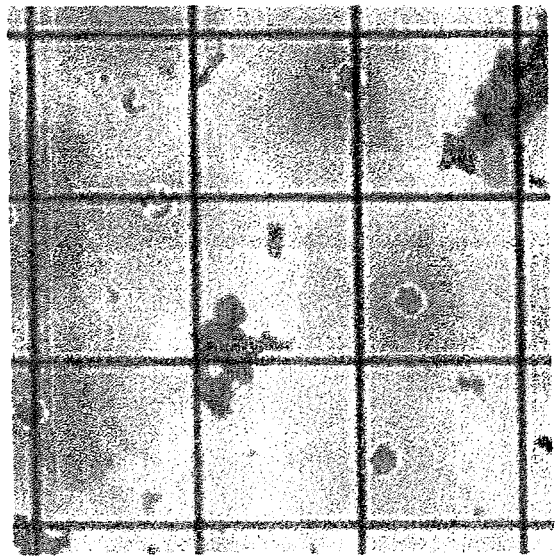
Figure 23:
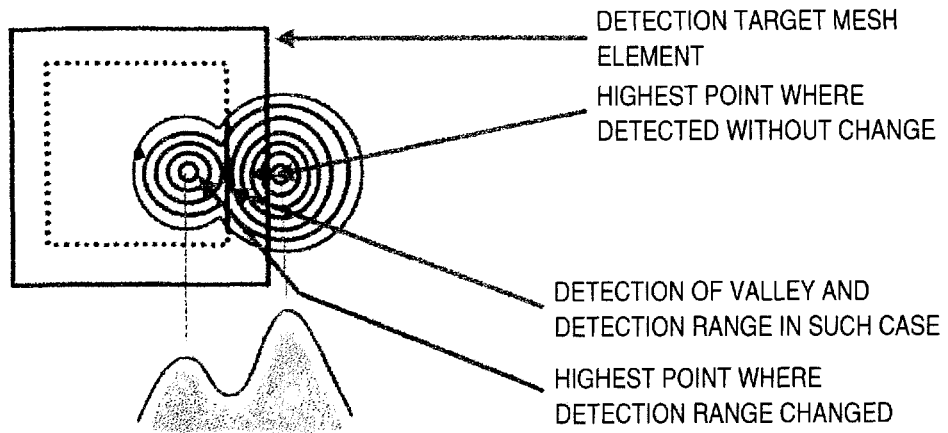
Figure 24:
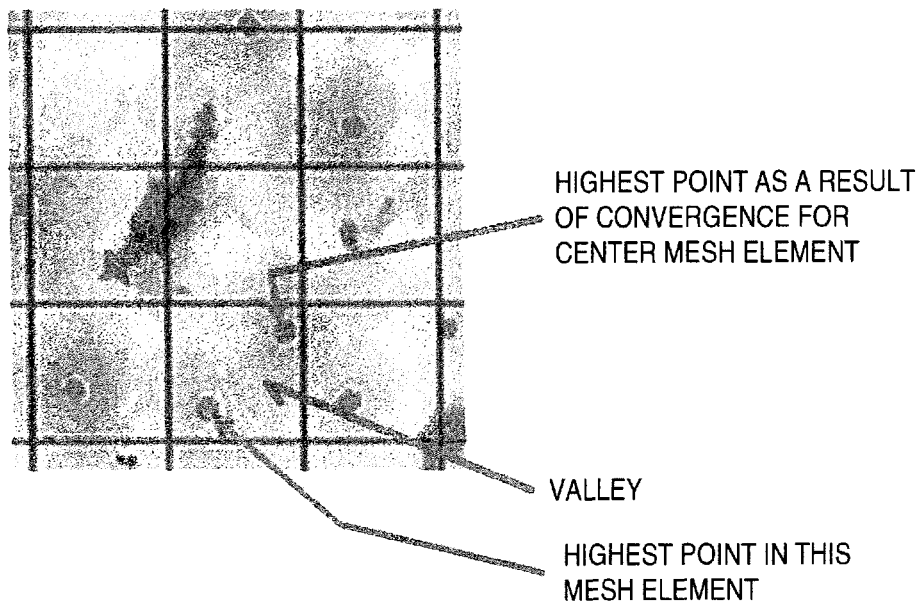
Figure 25:
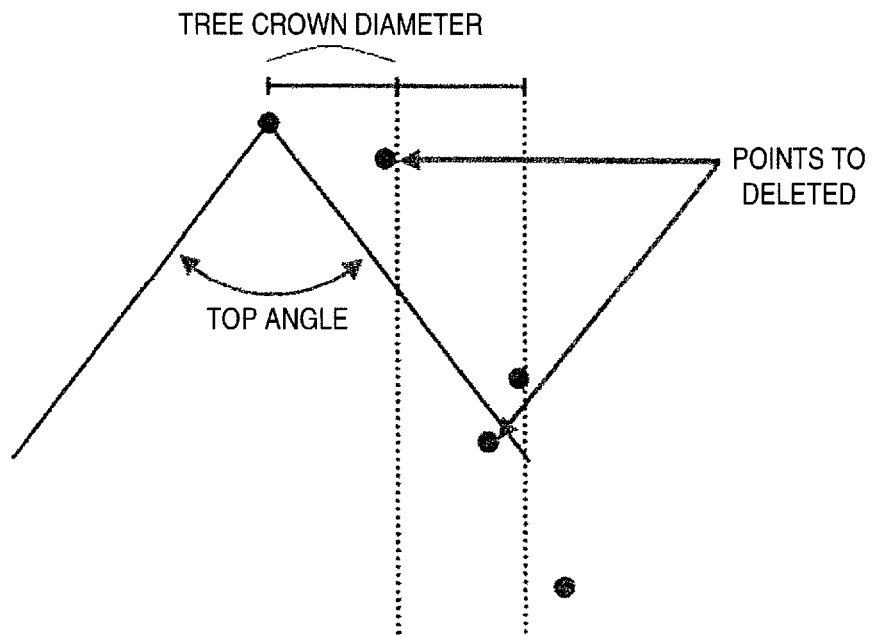
Figure 26:
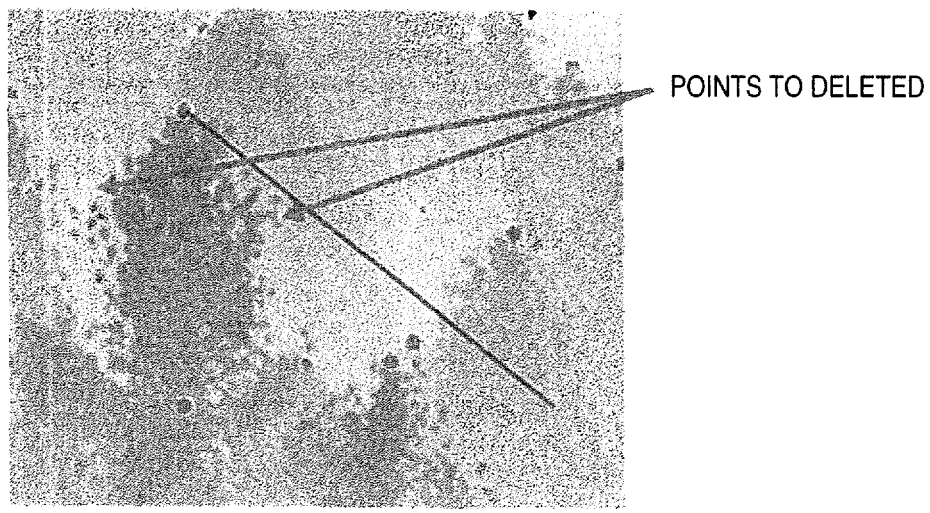
Figure 27:
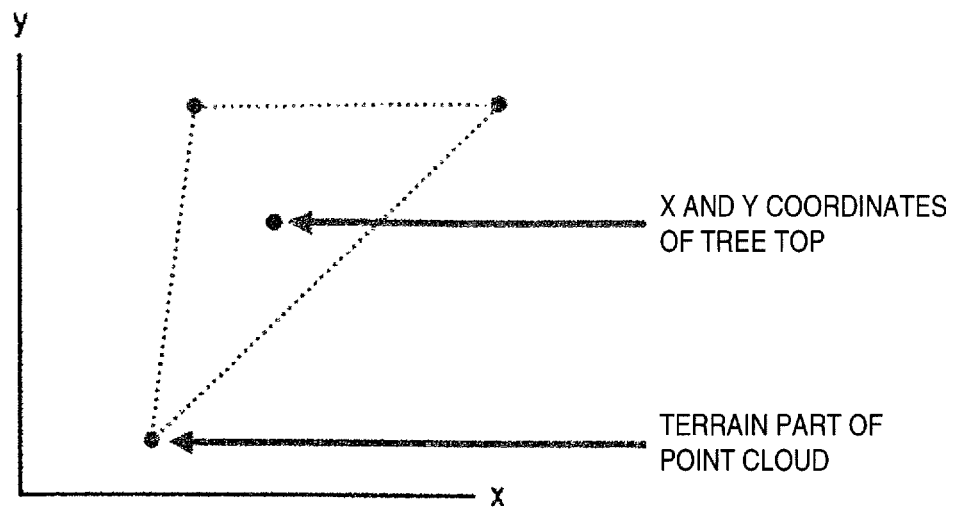
Figure 28:
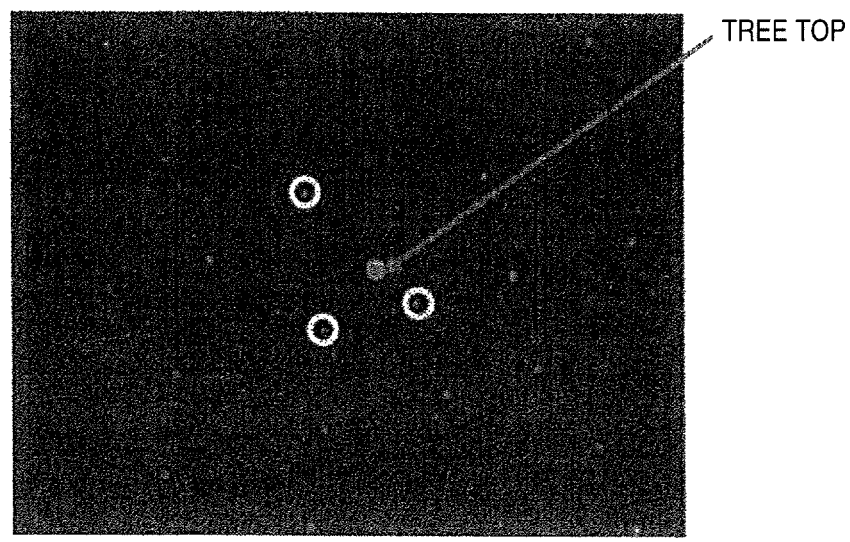
Figure 29:
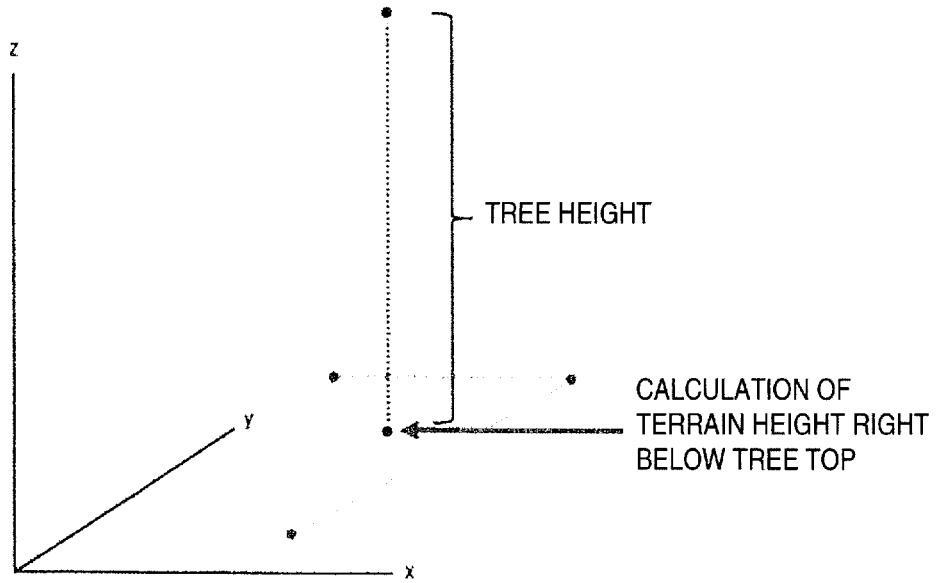
Figure 30:
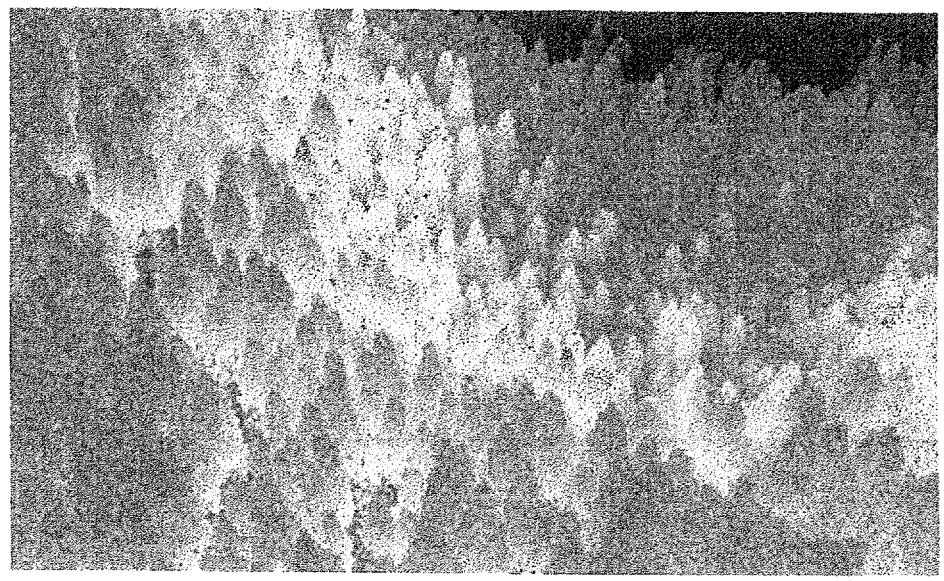
Figure 31:
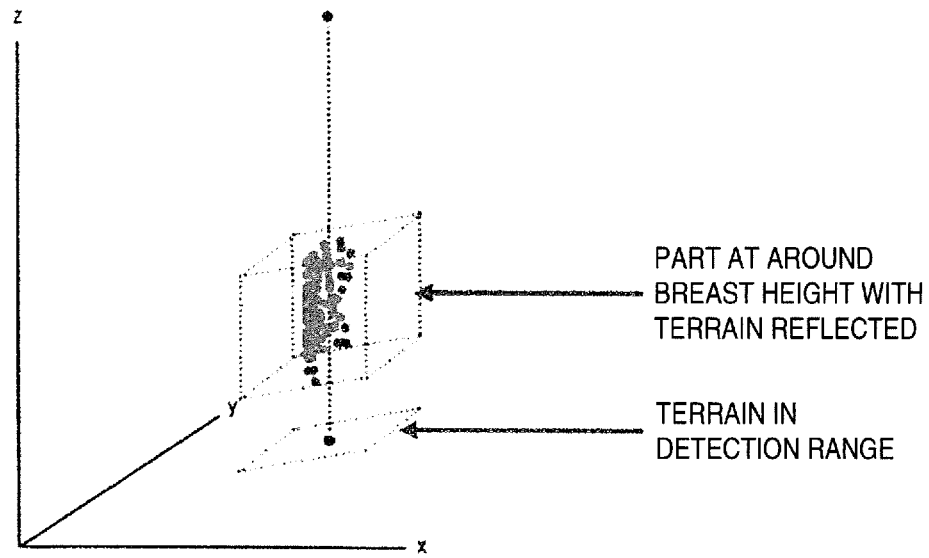
Figure 32:
Figure 33:
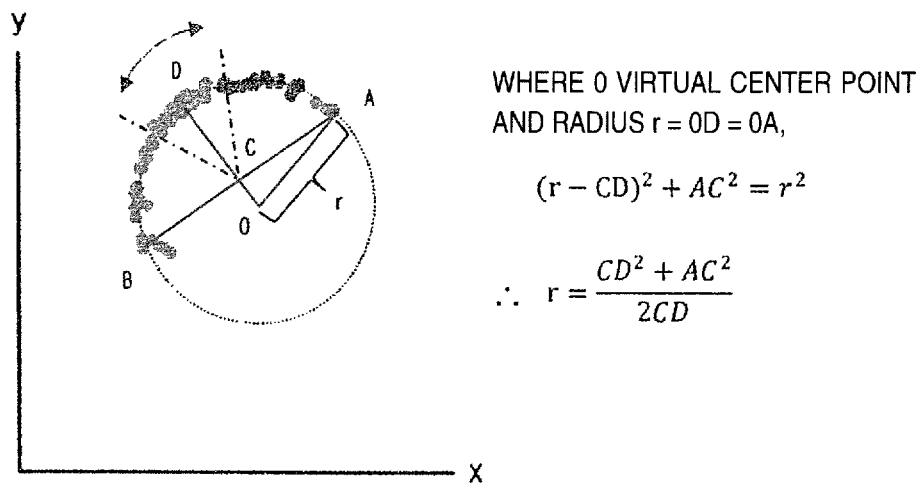
Figure 34:
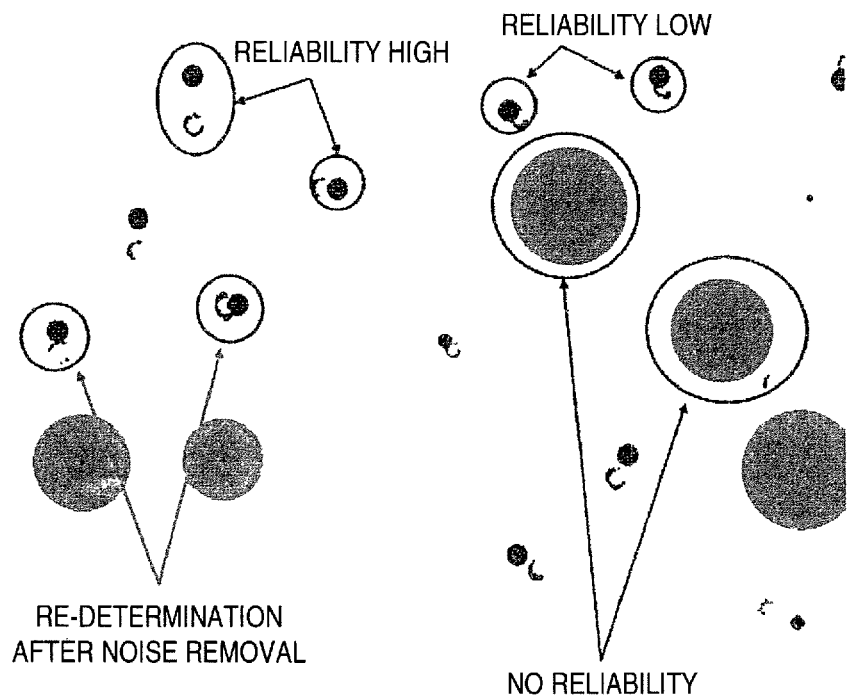
Figure 35:
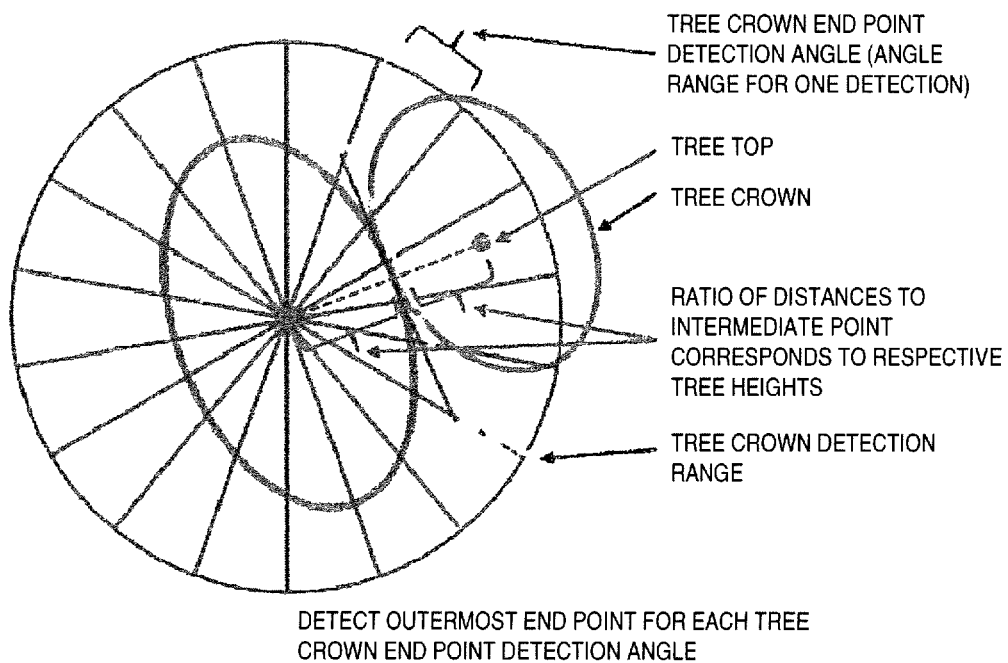
Figure 36:
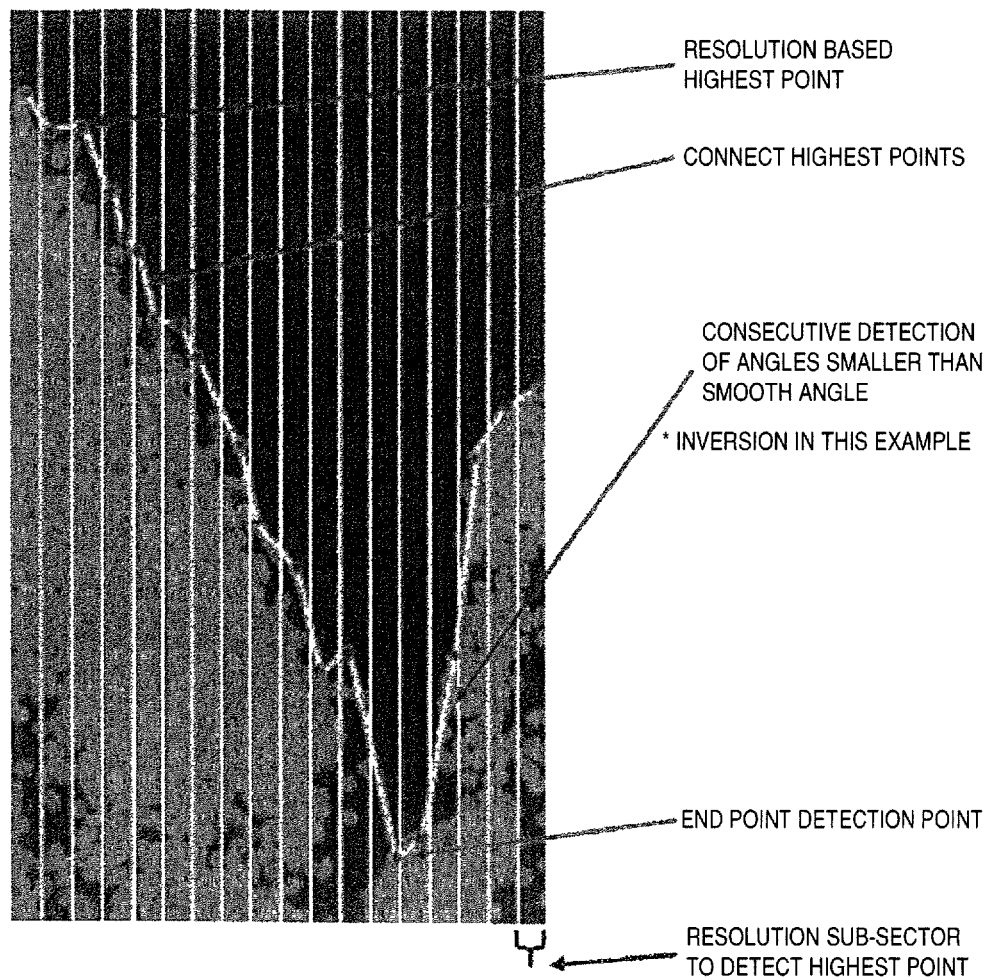
Figure 39:
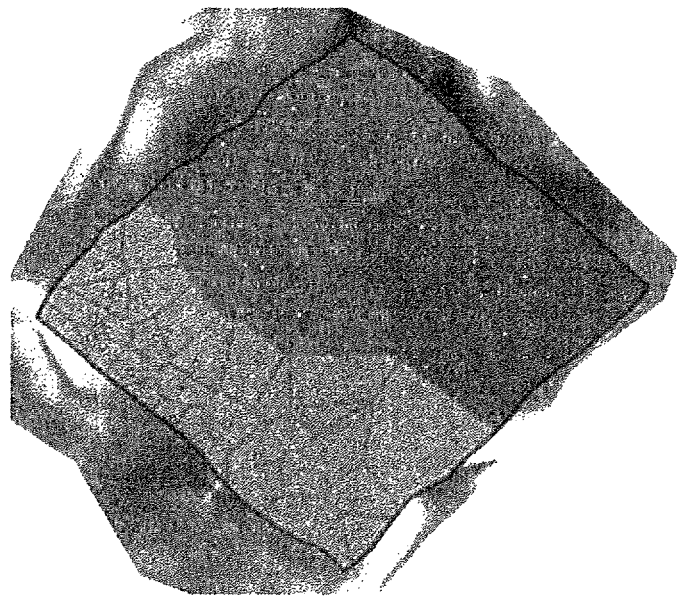
Figure 40:
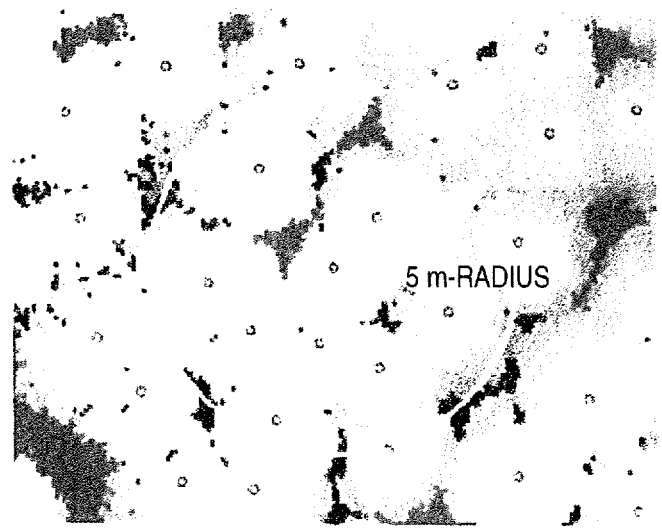
Figure 42:
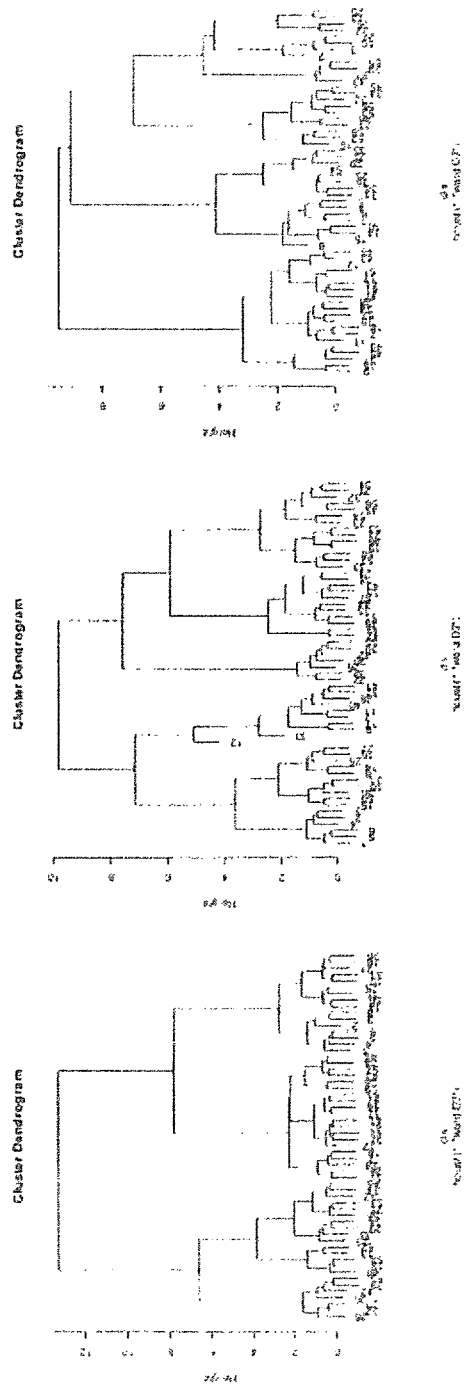

FIG. 20 is a flowchart of a forest resource information calculation method of the present embodiment;

FIG. 21 is a diagram for <Processing content detail 1: Tree top detection>, which illustrates a method for detecting a highest point in each of a mesh element and a virtual detection range;

FIG. 22 is a diagram for <Processing content detail 1: Tree top detection>, which illustrates an example actual detection result based on the method in FIG. 21;

FIG. 23 is a diagram for <Processing content detail 1: Tree top detection>, which illustrates a method for changing a detection range where there is a valley between highest points;

FIG. 24 is a diagram for <Processing content detail 1: Tree top detection>, which illustrates an example actual detection result based on the method in FIG. 23;

FIG. 25 is a diagram for <Processing content detail 1: Tree top detection>, which illustrates a method of deletion based on neighbor points and a top angle;

FIG. 26 is a diagram for <Processing content detail 1: Tree top detection>, which illustrates an example actual detection result based on the method illustrated in FIG. 25;

FIG. 27 is a diagram for <Processing content detail 2: Tree height detection>, which illustrates a method for acquiring three neighbor points in a terrain part;

FIG. 28 is a diagram for <Processing content detail 2: Tree height detection>, which illustrates an example actual detection result based on the method in FIG. 27;

FIG. 29 is a diagram for <Processing content detail 2: Tree height detection>, which illustrates a method for calculation of a terrain elevation and calculation of a tree height;

FIG. 30 illustrates an image for <Processing content detail 3: Tree trunk detection and breast height diameter calculation>, which shows acquired forest point cloud data and tree top detection positions;

FIG. 31 is a diagram for <Processing content detail 3: Tree trunk detection and breast height diameter calculation>, which illustrates a method for acquiring a point cloud in a part at around a breast height with a terrain reflected;

FIG. 32 is an image for <Processing content detail 3: Tree trunk detection and breast height diameter calculation>, which shows terrain point cloud data and a result of detection of tree trunk parts at around a breast height;

FIG. 33 is a diagram for <Processing content detail 3: Tree trunk detection and breast height diameter calculation>, which illustrates a method for calculation of a tree diameter (breast height diameter);

FIG. 34 is a diagram <Processing content detail 4: Breast height diameter reliability addition and noise removal>, which illustrates a manner of display of data for processing;

FIG. 35 is a diagram for <Processing content detail 5: Tree crown information calculation (Tree crown detection)>, which illustrates a method for specifying a tree crown detection range as viewed from directly above;

FIG. 36 is a diagram for <Processing content detail 5: Tree crown information calculation (Tree crown detection)>, which illustrates a method for detecting a highest point in each resolution and an end point as viewed directly from a side;

FIG. 37 is a diagram for <Processing content detail 5: Tree crown information calculation (Tree crown detection)>, which illustrates correction of a projecting point and removal of an extreme depression;

FIG. 38 is a diagram for <Processing content detail 6: Breast height diameter estimation>, which includes an example Voronoi diagram (white lines);

FIG. 39 is an image for <Processing content detail 6: Breast height diameter estimation>, which illustrates a result example of clustering of Voronoi cells of the Voronoi diagram;

FIG. 40 is an image for <Processing content detail 6: Breast height diameter estimation>, which illustrates a result of measurement of the count of standing trees within a radius of 5 m;

FIG. 41 is an example list of single tree data items for <Processing content detail 6: Breast height diameter estimation>; and

DETAILED DESCRIPTION OF THE PREFERRED EMBODIMENTS

The present invention will be described in detail below with reference to the drawings. Various modes of the present invention are described based on the drawings, and in principle, elements having a function common to the modes are provided with a same sign. Also, in each drawing, only major parts of configuration or operation may be illustrated.

Figure 1:
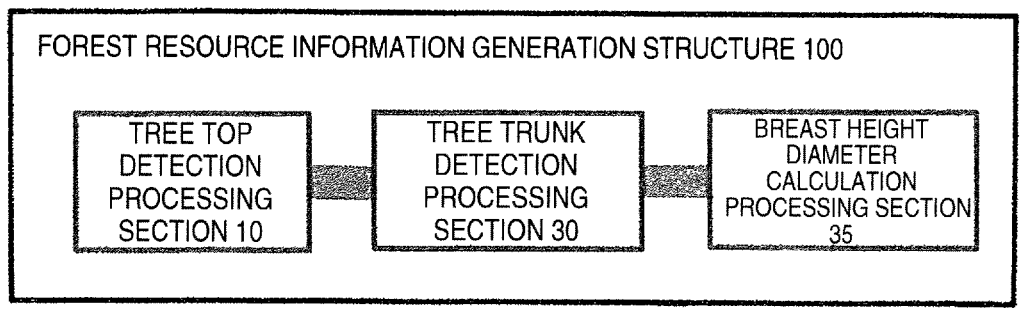
FIG. 1 is a diagram conceptually illustrating a basic configuration of a forest resource information generation structure of the present invention.
Figure 2:
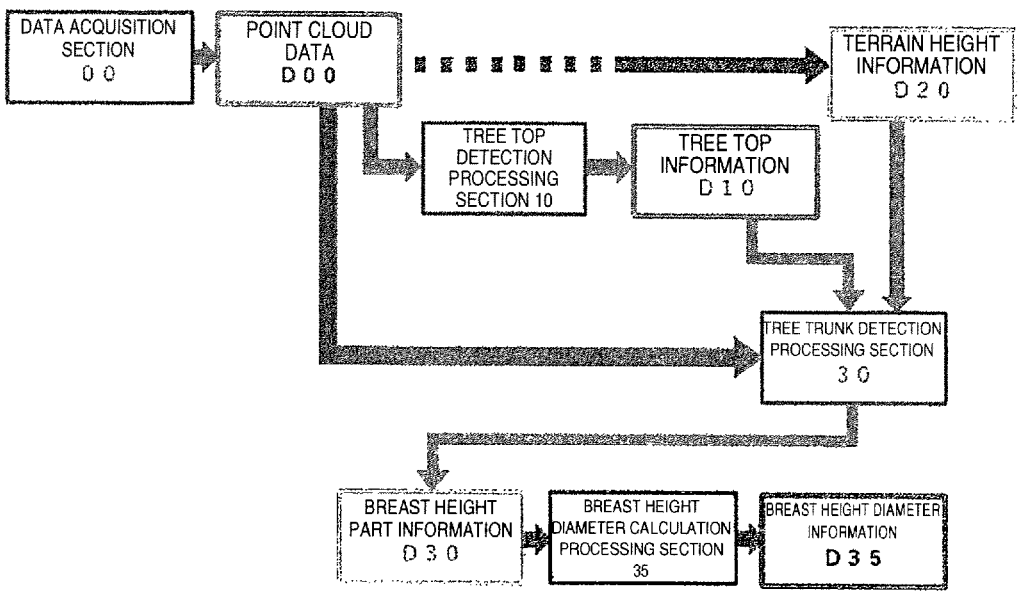
FIG. 2 is a diagram illustrating operation of the forest resource information generation structure illustrated in FIG. 1.

FIG. 1 is a diagram conceptually illustrating a basic configuration of a forest resource information generation structure of the present invention. FIG. 2 is a diagram illustrating operation of the forest resource information generation structure illustrated in FIG. 1. As illustrated in these figures, the forest resource information generation structure 100 is a structure for generating forest resource information using point cloud data D00 of forest resources, the point cloud data D00 being acquired via a remote sensing technique, and has a basic configuration including a tree top detection processing section 10 for obtaining tree top information D10, and a breast height diameter calculation processing section 35 for obtaining breast height diameter information D35 and further including a tree trunk detection processing section 30 for obtaining breast height part information D30 based on terrain height information D20 (described later with reference to FIGS. 3 and 4) obtained from the point cloud data D00 through a predetermined process and the tree top information D10, in which the breast height diameter information D35 is generated by the breast height part information D30 being subjected to processing in the breast height diameter calculation processing section 35.

In the forest resource information generation structure 100 having such configuration, tree top information D10 is obtained via processing in the tree top detection processing section 10 using point cloud data D00 of forest resources obtained via the remote sensing technique, breast height part information D30 is obtained based on the point cloud data, later-described terrain height information D20 and the tree top information D10 via processing in the tree trunk detection processing section 30, and then, breast height diameter information D35, which is important forest resource information, is generated by the breast height part information D30 being subjected to processing in the breast height diameter calculation processing section 35. The configuration that enables generation of important breast height diameter information D35 is basic to various forms of forest resource information generation structure 100 of the present invention, which will be described later.

Note that in the present invention, the point cloud data D00 can be acquired by any of the following:
<E1> acquisition via a measurement technique using a UAV (unmanned aerial vehicle or drone)-mounted laser scanner (UAV laser);
<E2> acquisition via a UAV laser and a measurement technique using a ground laser scanner (ground laser); and
<E3> creation from an SfM multi-viewpoint stereoscopic photograph using a UAV and acquisition via a ground laser. Therefore, unlike the conventional techniques, there is no need for actual measurement data collection such as a ground survey. Note that <E1> using a UAV laser alone is low in measurement cost and highly efficient. <E2> using both a UAV laser and a ground laser is high in measurement cost but is high in accuracy of an obtained tree trunk and has an advantage of enabling easy combination of point clouds. Also, <E3> using both a SfM photograph and a ground laser can be used for acquisition of the point cloud data D00 in the present invention; however, from the perspective of acquisition of a point cloud of a tree top and measurement efficiency, the method of <E1> or <E2> is desirable. Also, use of an SfM photograph alone results in obtainment of no point cloud of a tree trunk and use of a ground laser alone makes it difficult to obtain a point cloud of a tree top and thus is low in measurement efficiency, and thus, use of an SfM photograph alone and use of a ground laser alone are unfavorable or unavailable for acquisition of the point cloud data D00.

Also, a specific form of the forest resource information generation structure 100 of the present invention may be a form of hardware, that is, an apparatus or a form of software, that is, a computer program. In other words, a form of the forest resource information generation structure 100 of the present invention may be hardware or software as long as such form including respective elements forming the forest resource information generation structure 100 and having respective functions of the forest resource information generation structure 100. This will further be described later.

The forest resource information generation structure 100 of the present invention can be configured in such a manner that in the tree trunk detection processing section 30, a detection range with the tree top information D10 as a center is set, and in the detection range, a point cloud in a part at around a breast height with the later-described terrain height information D20 reflected is acquired as the breast height part information D30 from the point cloud data D00.

Also, in the breast height diameter calculation processing section 35, a substantially arc or substantially circular two-dimensional distribution with Z-coordinates removed from the acquired breast height part information D30 can be created and breast height diameter information D35 can be generated by a radius of the two-dimensional distribution being calculated according to a predetermined method.

Here, for the calculation according to a predetermined method, a geometric method, more specifically, a calculation method according to properties of chords and Pythagorean's theorem can be used, which will be described later in an embodiment (in FIGS. 31 and 33).

Also, in the tree top detection processing section 10, the tree top information D10 can be obtained from the point cloud data D00 using a mesh structure that is a planar structure in which units of the detection range, the units having a same shape and a same size (mesh element(s)) are consecutively provided. Then, for each mesh element, processing for repeating respective steps of:
<A1> extracting highest point data whose Z-coordinate is largest in the mesh element; and
<A2> re-setting a detection range having a size that is the same as that of the mesh element, with X and Y-coordinates of the highest point data as a center, in such a manner that <A1>, <A2>, <A1>, . . . , to make the highest point data converge, and at a point of time of change no longer occurring in the data, that is, at a point of time of the data converging, determining the converged highest point data as tree top information D10 can be performed in the tree top detection processing section 10. This will also be described in detail later in the embodiment (see FIGS. 21 and 22).

In the tree top detection processing section 10 of the forest resource information generation structure 100 of the present invention, for the tree top information 10 for each mesh element, processing for removing data whose Z-coordinate is smaller, the data being present around the tree top information 10, according to a predetermined criterion based on an estimated value of a tree crown diameter (estimated tree crown diameter) can be performed. Consequently, it is possible to further enhance accuracy of generated forest resource information. Specifically, respective criteria:
<B1> within the estimated tree crown diameter, delete data whose Z-coordinate is smaller than that of the tree top information 10; and
<B2> within a range that is double the estimated tree crown diameter, delete data present within a top angle estimated from a tree species,
can be provided to perform the processing, which will be described in detail later in the embodiment (see FIGS. 25 and 26).

Also, in the tree top detection processing section 10 of the forest resource information generation structure 100 of the present invention, during the repetition of <A1>, <A2>, . . . , if there is data whose Z-coordinate has a local minimal value in such a manner as to form a V-shape (valley) between two highest point data before and after the re-setting of the detection range, processing for sectioning the re-set detection range by the valley can be performed. In other words, there are an inclination from the former highest point data toward the valley (local minimal value) and a following inclination from the valley toward the re-set highest point data, the inclination having a gradient that is the reverse of that of the preceding inclination, and an area with the latter highest point data as a center can be estimated as an area of another single tree. This configuration will also be described in detail later in the embodiment (see FIGS. 23 and 24).

Figure 3:
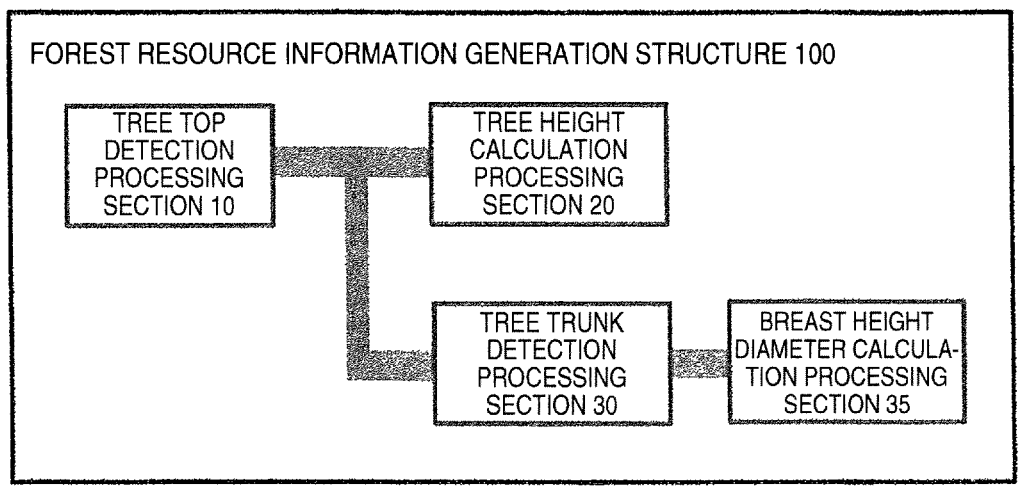
FIG. 3 is a diagram conceptually illustrating a configuration of a forest resource information generation structure of the present invention including a tree height calculation processing section.
Figure 4:
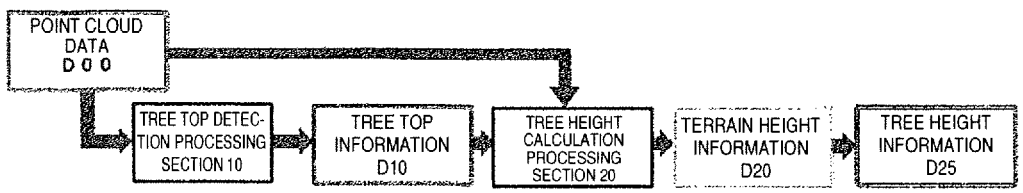
FIG. 4 is a diagram illustrating operation of the forest resource information generation structure illustrated in FIG. 3.

FIG. 3 is a diagram conceptually illustrating a configuration of a forest resource information generation structure of the present invention including a tree height calculation processing section. FIG. 4 is a diagram illustrating operation of the forest resource information generation structure illustrated in FIG. 3. As illustrated in these figures, the forest resource information generation structure 100 has a characteristic configuration including a tree height calculation processing section 20 for obtaining terrain height information D20 from lowermost layer data in point cloud data D00 and obtaining tree height information D25 from the terrain height information D20 and tree top information D10, in addition to the above-described configuration.

Because of such configuration being included, in the illustrated present forest resource information generation structure 100, in the tree height calculation processing section 20, processing for obtaining the terrain height information D20 from the lowermost layer data in the point cloud data D00 is performed, and furthermore, processing for generating the tree height information D25 from the terrain height information D20, and the tree top information D10 detected by the tree top detection processing section 10 is performed.

In the processing in the tree height calculation processing section 20, a TIN (triangulated irregular network) including X and Y-coordinates of the tree top information can be created from data of three points neighboring the tree top information D10 to obtain terrain height information D20 and the tree height information D25 can be generated by subtraction of the terrain height information D20 from a Z-coordinate of the tree top information D10. In other words, the tree height information D25, which is forest resource information necessary for tree volume calculation, is generated by Tree top information $D10$−Terrain height information $D20$=Tree height information $D25$.

The forest resource information generation structure 100 of the present configuration will be described in detail later in the embodiment (see FIGS. 27, 28 and 29).

Figure 5:
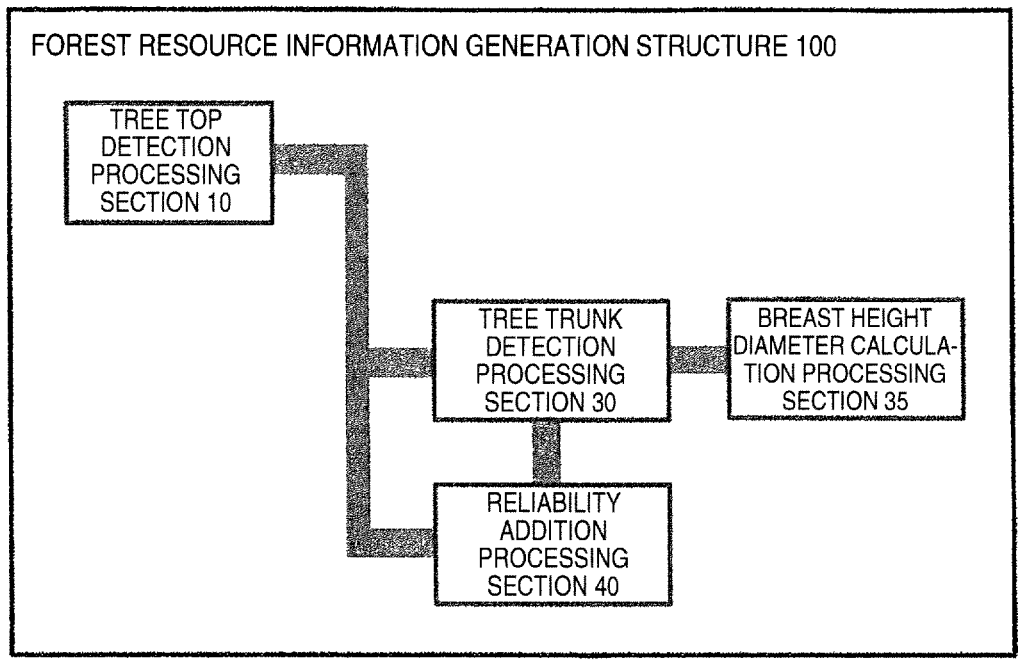
FIG. 5 is a diagram conceptually illustrating a configuration of a forest resource information generation structure of the present invention including a reliability addition processing section.
Figure 6:
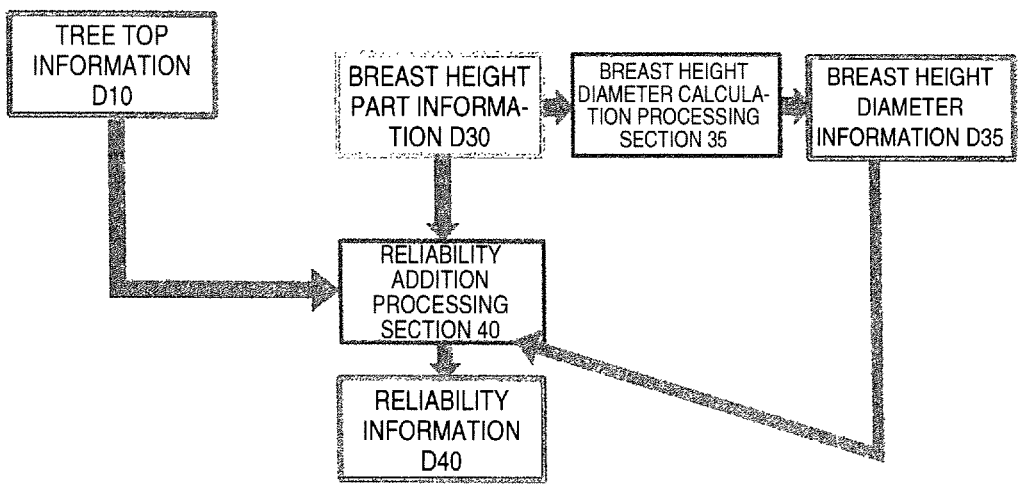
FIG. 6 is a diagram illustrating operation of the forest resource information generation structure illustrated in FIG. 5.

FIG. 5 is a diagram conceptually illustrating a configuration of a forest resource information generation structure of the present invention including a reliability addition processing section. FIG. 6 is a diagram illustrating operation of the forest resource information generation structure illustrated in FIG. 5. As illustrated in these figures, the forest resource information generation structure 100 includes a breast height diameter reliability addition processing section (reliability addition processing section) 40 for evaluating reliability of breast height diameter information D35 generated by the breast height diameter calculation processing section 35 in addition to any of the above-described configurations, and has a characteristic configuration in which in the reliability addition processing section 40, reliability information D40 for evaluation of whether or not the breast height diameter information has reliability, the reliability information D40 being determined according to comparison between the breast height part information D30 in a the two-dimensional form and the breast height diameter information D35 generated by the breast height diameter calculation processing section 35, is added to the breast height diameter information D35.

Because of such configuration being included, in the illustrated forest resource information generation structure 100, in the reliability addition processing section 40, predetermined reliability information D40 determined according to comparison between the breast height part information D30 in a two-dimensional form and breast height diameter information D35 generated in the breast height diameter calculation processing section 35 is added to the breast height diameter information D35. The reliability information D40 is information relating to evaluation of a degree of reliability of the breast height diameter information D35 generated by the breast height diameter calculation processing section 35. For example, the reliability can be quantified as "2" if it is high, "1" if it is low and "0" if no reliability is recognized, and such evaluation can serve as a basis for the subsequent processing, which will also be described in detail later in the embodiment (see FIG. 34).

Figure 7:
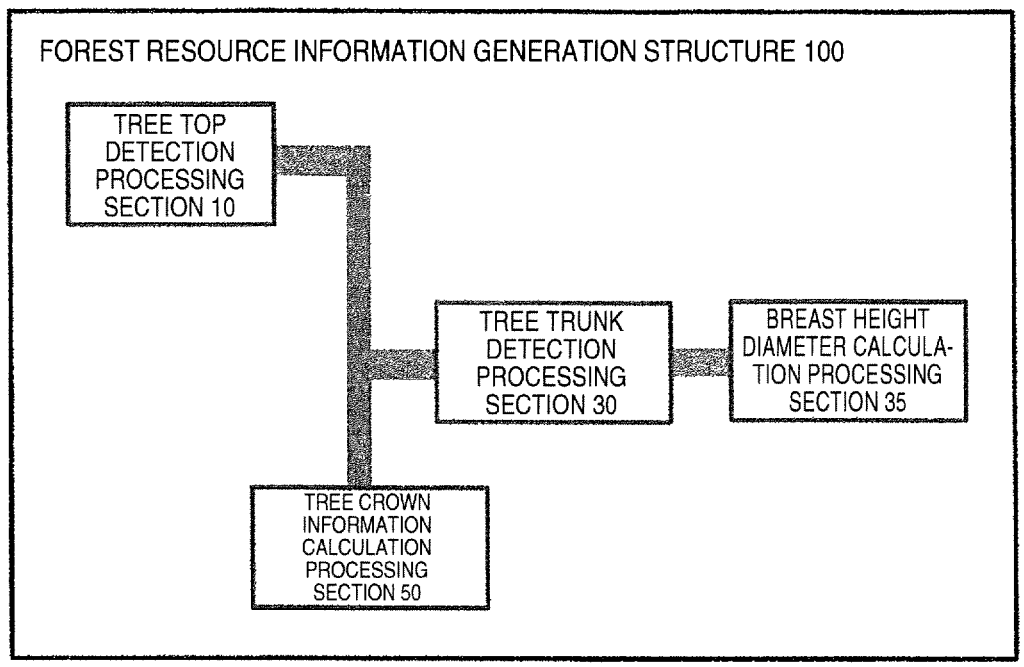
FIG. 7 is a diagram conceptually illustrating a configuration of a forest resource information generation structure of the present invention including a tree crown information calculation processing section.
Figure 8:
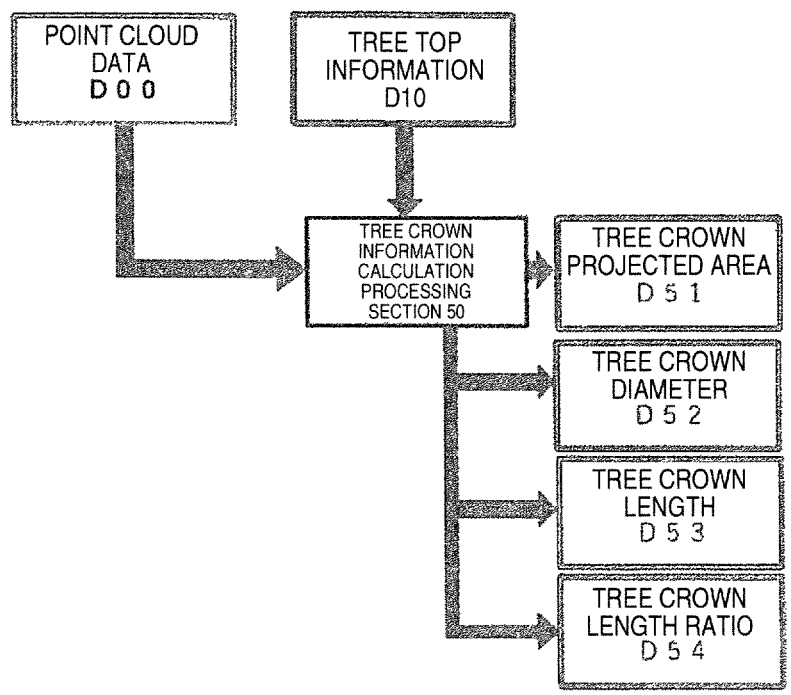
FIG. 8 is a diagram illustrating operation of the forest resource information generation structure illustrated in FIG. 7.

FIG. 7 is a diagram conceptually illustrating a configuration of a forest resource information generation structure of the present invention including a tree crown information calculation processing section. FIG. 8 is a diagram illustrating operation of the forest resource information generation structure illustrated in FIG. 7. As illustrated in these figures, the forest resource information generation structure 100 includes a tree crown information calculation processing section 50 for obtaining tree crown projected area information D51 and other tree crown information, in addition to any of the above-described configurations, and has a characteristic configuration in which in the tree crown information calculation processing section 50, processing for extracting a data group for specifying a tree crown with a tree top as a center (tree crown detection target data group) from point cloud data D00, dividing the data group by a predetermined angle into circumferential angular sectors (angular sector(s)), specifying a point (end point) estimated as an outermost edge of a tree crown in each angular sector and connecting the respective end points to determine an outer circumference of the tree crown is performed.

Because of such configuration being included, in the illustrated forest resource information generation structure 100, in the tree crown information calculation processing section 50, processing for extracting a tree crown detection target data group to be used for specification of a tree crown with a tree top as a center from the point cloud data D00, circumferentially dividing the extracted tree crown detection target data group by a predetermined angle to form angular sectors, specifying an end point estimated as an outermost edge of a tree crown in each of the formed angular sectors and connecting the end points specified in the respective angular sectors via a line to determine an outer circumference of the tree crown is performed. Based on that processing, tree crown information pieces such as tree crown projected area information D51, tree crown diameter information D52, tree crown length information D53 and tree crown length ratio information D54 are generated.

In the tree crown information calculation processing section 50, processing for dividing each angular sector in a centrifugal direction with a predetermined resolution into radial sectors (resolution sub-sector(s)) and connecting highest point data specified in the respective resolution sub-sectors via a line to draw a schematic figure of a side contour of the tree crown and specifying an end point based on a degree of ab inclination of a line segment included in the schematic figure can be performed.

Here, a relationship between an angular sector and a resolution sub-sector will be described. For example, where a baumkuchen with a center regarded as a tree top is assumed, each of cut portions obtained by circumferentially cutting the baumkuchen by a predetermined angle (hereinafter, "cut baumkuchen portion(s)") is an angular sector, each of portions defined by annular ring-like lines in a cut surface of each cut baumkuchen portion regarded as an angular sector can be regarded as a resolution sub-sector. In other words, an angular sector is a segment resulting of a horizontal structure of a tree crown being divided circumferentially and a resolution sub-sector is a segment resulting from a vertical structure of the tree crown being divided in the centrifugal direction.

Because of such configuration being included, in the illustrated present forest resource information generation structure 100, by the processing in the tree crown information calculation processing section 50, each angular sector is divided in the centrifugal direction with a predetermined resolution into resolution sub-sectors and highest point data specified in the respective resolution sub-sectors are connected via a line to draw a schematic figure of a side contour of a tree crown and based on a degree of an inclination of a line segment included in the schematic figure, an end point is specified.

For specification of an end point in each resolution sub-sector, any one or any combination of the following criteria can be used:

<C1> if the inclination is smaller than a predetermined angle indicating smoothness, for example, 0°, through a predetermined number of consecutive line segments of the schematic figure, determine a point immediately preceding the consecutive line segments as an end point;

<C2> if a sign of the inclination is inverse through a predetermined number of consecutive line segments, determine a point immediately preceding the consecutive line segments as an end point; and <C3> if there is no point in a resolution sub-sector, determine a point detected last, that is, a point detected last in an immediately preceding resolution sub-sector, as an end point.

Also, the tree crown information calculation processing section 50 of the present forest resource information generation structure 100 can be configured in such a manner that if there is a tree top (other tree top) other than a processing target tree top (relevant tree top) in the tree crown detection target data group, processing for determining a boundary between tree crowns according to tree heights of these tree tops is performed. In other words, a boundary between the relevant tree crown relating to the relevant tree top and the other tree crown relating to the other tree top can be calculated, for example, using a certain calculation formula with these tree heights as variables.

As described above, the tree crown information calculation processing section 50 of the present forest resource information generation structure 100 specifies a tree crown via end points in the respective angular sectors, but can be configured to enable processing for correction of tree crown formation using end points. In other words, where a shape drawn by simply connecting the respective end points via a line deviates from an expected tree crown shape range, such as the shape having abnormal projections and recesses, it is desirable or necessary to make some kind of correction to the shape, and the above configuration of the tree crown information calculation processing section 50 provides a function that performs correction in such case.

Such correction processing can be processing for modifying some of the end points determining the tree crown shape. In other words, the correction processing is processing for changing end points specified in respective angular sectors. For specific correction processing, it is favorable to use a horizontal distance from the tree top to the end point (end point distance), and for example, it is possible to employ a modification method in which the end point distance for the correction target end point is increased or decreased based on respective end point distances for two end points sandwiching (located on opposite sides of) the correction target end point. Various configurations of the forest resource information generation structure 100 including the above-described tree crown information calculation processing section 50 will be described in detail later in the embodiment (see FIGS. 35, 36 and 37).

Figure 9:
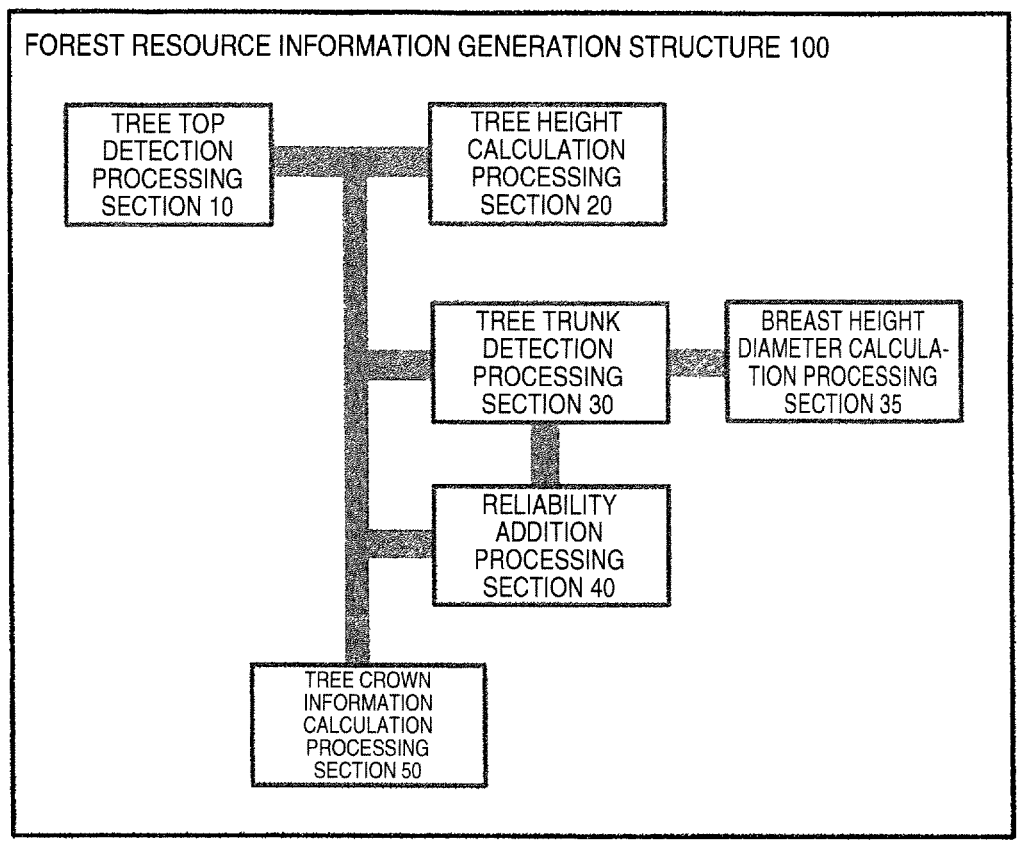
FIG. 9 is a diagram conceptually illustrating a configuration of a forest resource information generation structure of the present invention including the respective processing sections illustrated in FIGS. 1 to 8.

FIG. 9 is a diagram conceptually illustrating a configuration of a forest resource information generation structure of the present invention including the processing sections illustrated in FIGS. 1 to 8. Based on point cloud data D00, tree top information D10 is obtained in the tree top detection processing section 10. Based on the tree top information D10, terrain height information D20 and tree height information D25 are generated in the tree height calculation processing section 20, breast height part information D30 is generated in the tree trunk detection processing section 30 and tree crown information pieces such as tree crown projected area information D51 are generated in the tree crown information calculation processing section 50, respectively. Also, based on the breast height part information D30, breast height diameter information D35 is generated in the breast height diameter calculation processing section 35. Also, in the reliability addition processing section 40, reliability information D40 representing reliability of the breast height diameter information D35 is added to the breast height diameter information D35 via predetermined processing.

Figure 10:
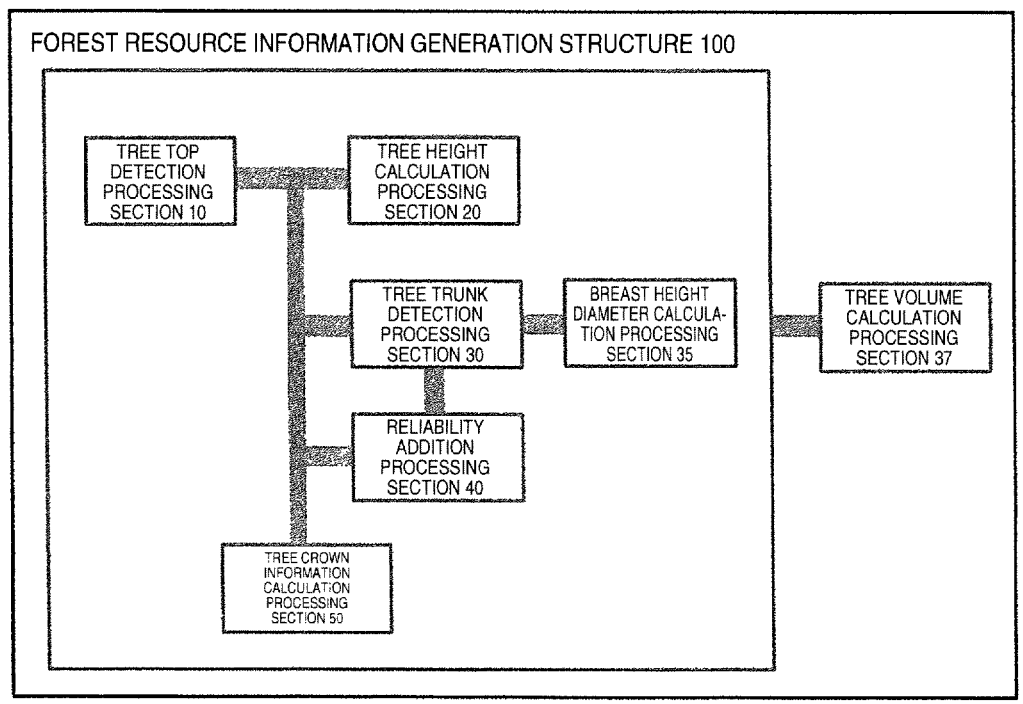
FIG. 10 is a diagram conceptually illustrating a configuration of a forest resource information generation structure of the present invention including a tree volume calculation processing section.
Figures 2, 11:
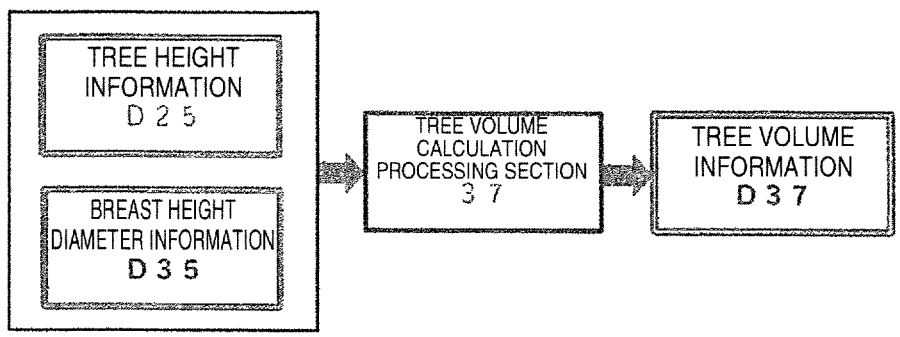
FIG. 11 is a diagram illustrating operation of the forest resource information generation structure illustrated in FIG. 10.

FIG. 10 is a diagram conceptually illustrating a configuration of a forest resource information generation structure of the present invention including a tree volume calculation processing section. FIG. 11 is a diagram illustrating operation of the forest resource information generation structure illustrated in FIG. 10. As illustrated in these figures, the present forest resource information generation structure 100 has a characteristic configuration including a tree volume calculation processing section 37 for calculating tree volume information D37 based on breast height diameter information D35, in addition to an above-described configuration. Here, the above-described configuration here is a configuration including at least the tree top detection processing section 10, the tree height calculation processing section 20, the tree trunk detection processing section 30 and the breast height diameter calculation processing section 35 in the configuration illustrated in the present figure.

Because of such configuration being included, in the illustrated forest resource information generation structure 100, based on breast height diameter information D35 and tree height information D25, tree volume information D37 is calculated in the tree volume calculation processing section 37. For a specific method for tree volume calculation, a known method can be employed. For example, the cedar tree volume equations indicated in FIG. 11-2 ("Standing Tree Trunk Volume Table (For Eastern Japan)" edited by Planning Division, Forestry Agency, Aomori, Iwate and Miyagi region (J-FIC), 1970) can be used for calculation.

Figure 12:
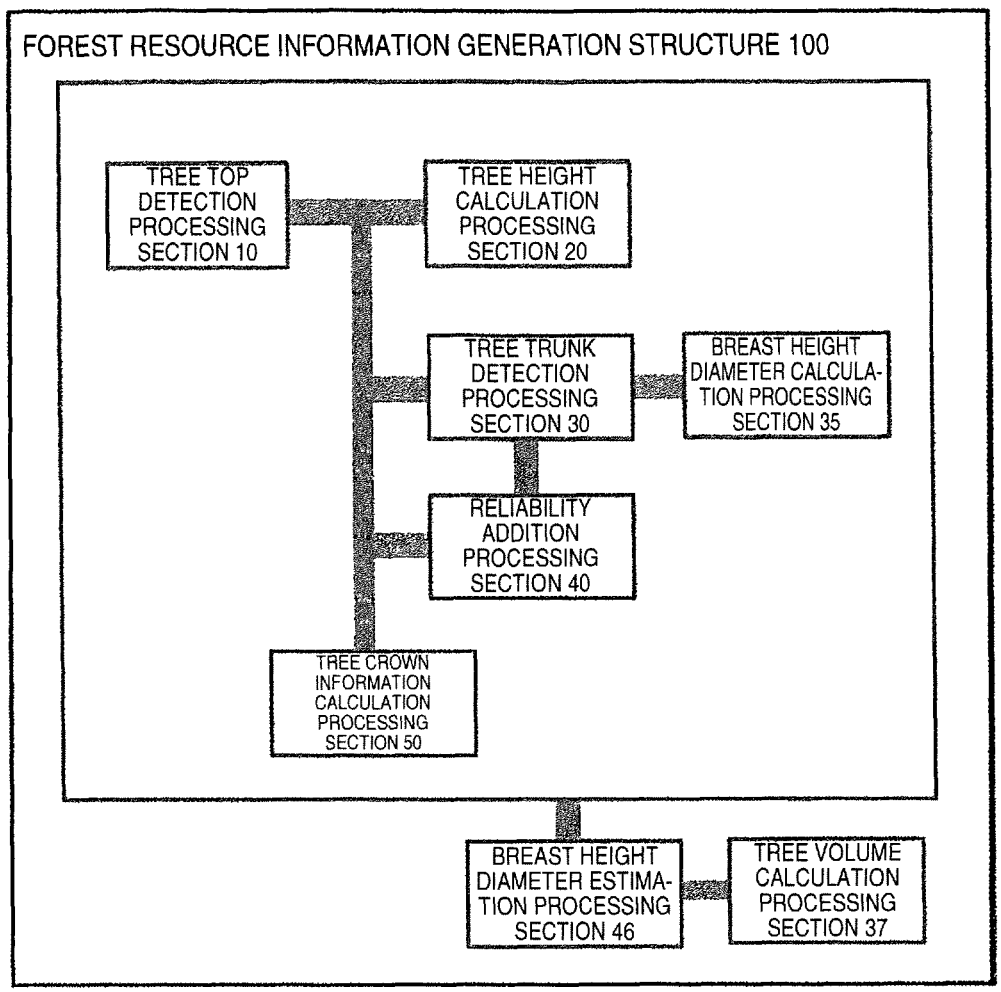
FIG. 12 is a diagram conceptually illustrating a configuration of a forest resource information generation structure of the present invention including a breast height diameter estimation processing section.
Figure 13:
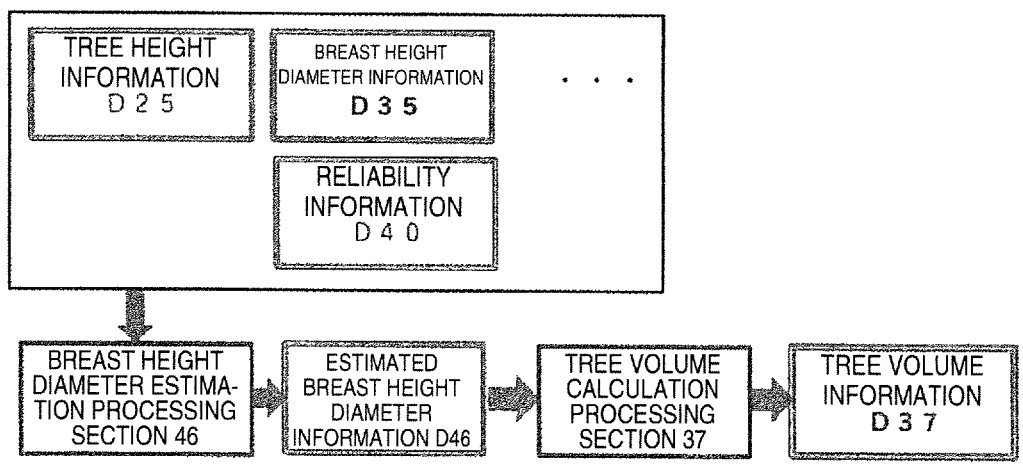
FIG. 13 is a diagram illustrating operation of the forest resource information generation structure illustrated in FIG. 12.

FIG. 12 is a diagram conceptually illustrating of a configuration of a forest resource information generation structure of the present invention including a breast height diameter estimation processing section. FIG. 13 is a diagram illustrating operation of the forest resource information generation structure illustrated in FIG. 12. As illustrated in these figures, the present forest resource information generation structure 100 has a characteristic configuration including a reliability addition processing section 40 relating to evaluation of reliability of breast height diameter information and also including a breast height diameter estimation processing section 46 for, for breast height diameter information D35 with no reliability or low reliability, estimating a breast height diameter based on information generated in the present forest resource information generation structure 100 (generated forest resource information) to generate estimated breast height diameter information D46.

Because of such configuration being included, in the illustrated present forest resource information generation structure 100, for breast height diameter information D35 evaluated as having no reliability or low reliability through processing by the reliability addition processing section 40, breast height diameter estimation processing is performed in the breast height diameter estimation processing section 46 to generate estimated breast height diameter information D46, which is more reliable and accurate breast height diameter information. For the breast height diameter estimation processing, tree height information D25, breast height diameter information D35 and other generated forest resource information are used. The forest resource information generation structure 100 of the present configuration will be described in detail later in the embodiment (see FIGS. 38, 39, 40, 41, etc.).

Although the tree crown information calculation processing section 50 in the configuration illustrated in FIG. 12 is not an essential component but it is desirable that the tree crown information calculation processing section 50 be included. This is because a larger number of available generated forest resource information pieces are more advantageous in order to ensure possibility of more accurate breast height diameter estimation.

Also, as illustrated in FIGS. 12 and 13, the forest resource information generation structure 100 can include a tree volume calculation processing section 37 for calculating tree volume information D37 based on breast height diameter information D35 or estimated breast height diameter information D46. At least for breast height diameter information D35 having low reliability, estimated breast height diameter information D46 obtained by the breast height diameter estimation processing section 46 is used for tree volume calculation processing. Such configuration of the present forest resource information generation structure 100 enables generating more accurate tree volume information D37.

Figure 14:
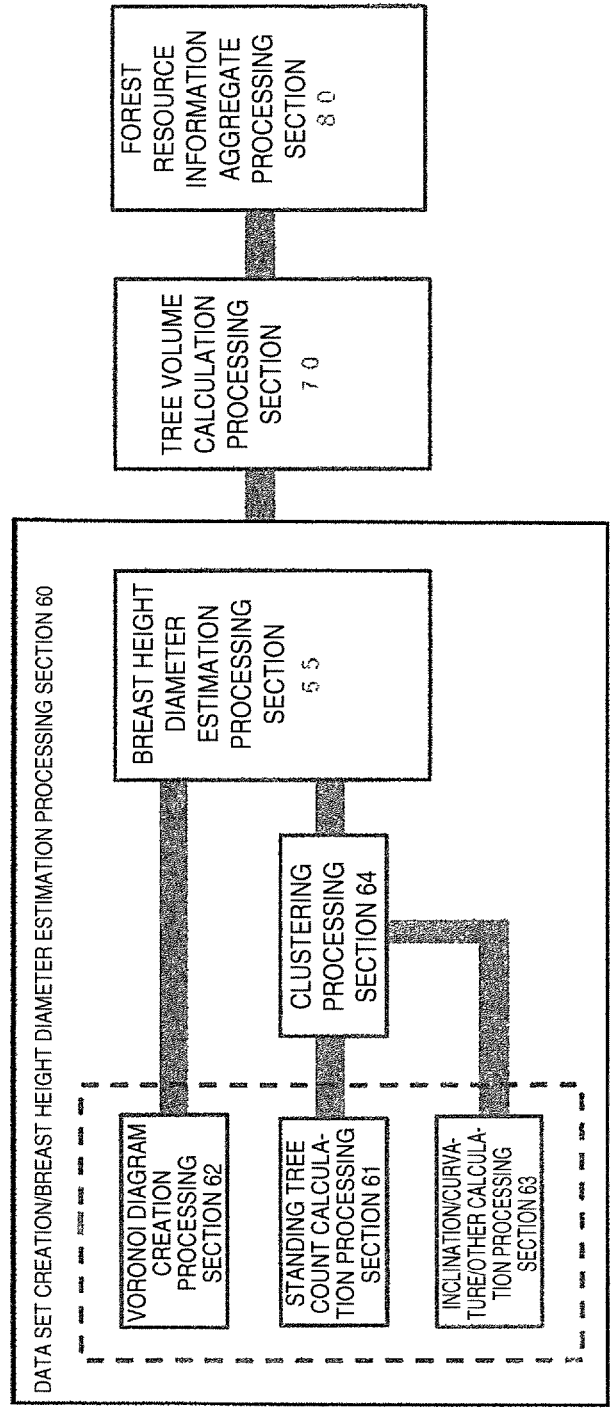
FIG. 14 is a diagram conceptually illustrating an example configuration of a breast height diameter estimation processing section in a forest resource information generation structure of the present invention.

FIG. 14 is a diagram conceptually illustrating an example configuration of a breast height diameter estimation processing section of a forest resource information generation structure of the present invention. As illustrated in the figure, a breast height diameter estimation processing section 65 can be regarded as being configured as a part of a data set creation/breast height diameter estimation processing section 60. Also, a tree volume calculation processing section 70 can be provided downstream of the data set creation/breast height diameter estimation processing section 60 and a forest resource information aggregate processing section 80 can be provided downstream of the tree volume calculation processing section 70. In the tree volume calculation processing section 70, a tree volume is calculated based on, for example, estimated breast height diameter information generated in the data set creation/breast height diameter estimation processing section 60, and in the forest resource information aggregate processing section 80, generated forest resource information pieces, including the tree volume, generated by the present forest resource information generation structure 100 are subjected to aggregate calculation processing and then output.

Breast height diameter estimation processing in the breast height diameter estimation processing section 65 is performed using an information set including the generated forest resource information pieces (single tree data set for estimation equation creation, which is not illustrated). Also, in the single tree data set for estimation equation creation, cluster numbers generated by Voronoi cells of a Voronoi diagram covering a target forest stand being subjected to clustering processing are spatially joined to single tree data, and in the data set creation/breast height diameter estimation processing section 60, a Voronoi diagram creation processing section 62 that creates such Voronoi diagram and a clustering processing section 64 that performs the clustering processing are provided upstream of the breast height diameter estimation processing section 65.

As illustrated in the figure, the data set creation/breast height diameter estimation processing section 60 can include a standing tree count calculation processing section 61 and an inclination/curvature/other calculation processing section (inclination and other calculation processing section) 63 in addition to the Voronoi diagram creation processing section 62. A single tree data set for estimation equation creation is completed by supplement of the generated forest resource information pieces by information pieces generated by the respective processing sections and spatial joining of the cluster numbers generated by clustering processing of the Voronoi diagram covering the target forest stand in the clustering processing section 64, and then is provided for processing in the breast height diameter estimation processing section 65.

A supplementary description will be provided on the inclination/curvature/other calculation processing section (inclination and other calculation processing section) 63. Respective information pieces relating to a terrain, such as an inclination and a curvature, included in a layer of the Voronoi diagram, which are to be provided for processing in the breast height diameter estimation processing section 65, are generated in processing in the inclination/curvature/other calculation processing section (inclination and other calculation processing section) 63 from a digital terrain model (DTM) obtained from point cloud data.

Figure 15:
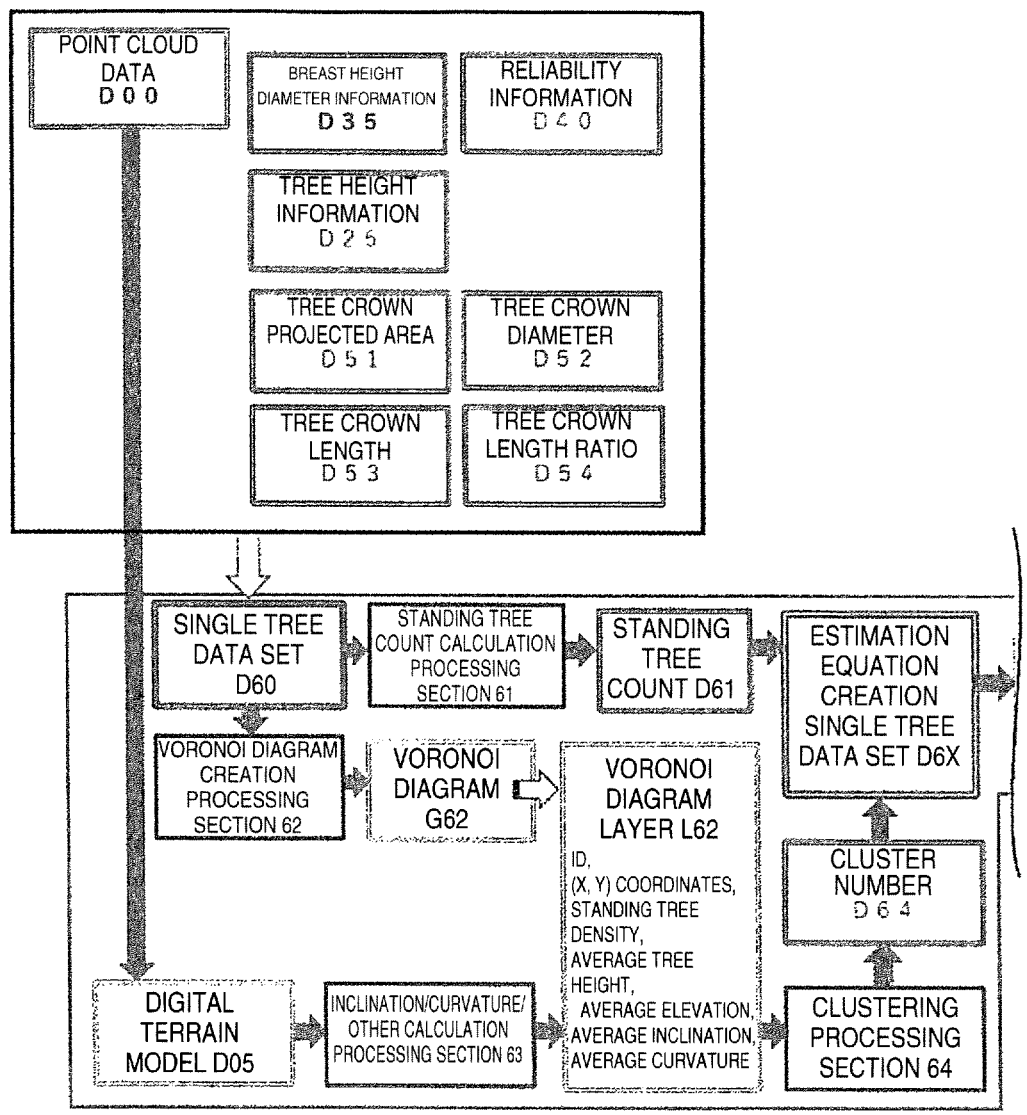
FIG. 15 is a diagram illustrating operation of the breast height diameter estimation processing section illustrated in FIG. 14 and configurations preceding or following the breast height diameter estimation processing section (operation until a single tree data set for estimation equation creation is obtained)
Figure 16:
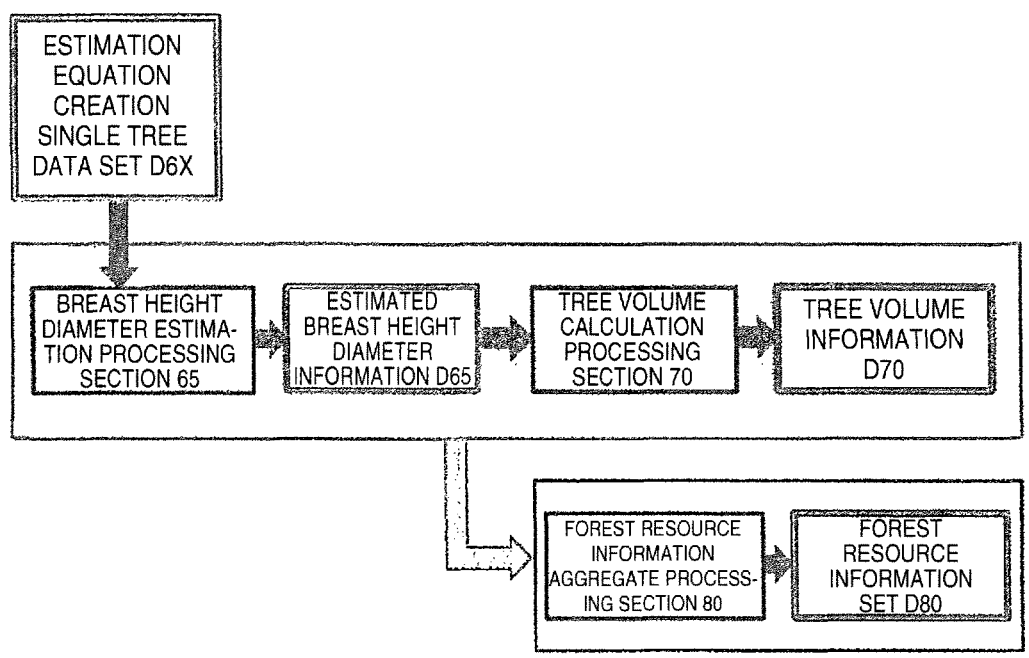
FIG. 16 is a diagram illustrating operation of the breast height diameter estimation processing section illustrated in FIG. 14 and the configurations preceding or following the breast height diameter estimation processing section (operation after a single tree data set for estimation equation creation is obtained)

FIGS. 15 and 16 are diagrams illustrating operation of the breast height diameter estimation processing section illustrated in FIG. 14 and configurations preceding or following the breast height diameter estimation processing section. Of these figures, the former illustrates operation until a single tree data set for estimation equation creation is obtained and the latter illustrates operation after obtainment of the data set. In other words, FIG. 15 illustrates operation at a stage preceding the breast height diameter estimation processing section 65 in the data set creation/breast height diameter estimation processing section 60 (upstream-side configuration) and FIG. 16 illustrates the breast height diameter estimation processing section 65 and FIG. 16 further illustrates operation at a stage following the breast height diameter estimation processing section 65 (downstream-side configuration).

As illustrated in FIG. 15, respective generated forest resource information pieces generated based on point cloud data D00, that is, a single tree data set D60 including tree trunk information pieces such as breast height diameter information D35, reliability information D40, tree height information D25 and tree crown projected area information D51 are provided to the standing tree count calculation processing section 61 and the Voronoi diagram creation processing section 62. Standing tree count information D61 is generated by processing in the standing tree count calculation processing section 61. The standing tree count information D61 is stored in an estimation equation creation single tree data set D6X, based on which an estimation equation used for tree height diameter estimation is to be obtained. Note that the standing tree count information D61 is measurement information on the count of standing trees included in an arbitrary range set with each single tree as a center.

Also, in the Voronoi diagram creation processing section 62, a Voronoi diagram G62 is created based on single tree data. On the other hand, a digital terrain model (DTM) is obtained based on the point cloud data D00 and provided to the inclination/curvature/other calculation processing section 63 to create an inclination and curvature layer. From the DTM and the inclination and curvature layer, respective average values of elevations, inclinations and curvatures in a range of the Voronoi diagram are calculated and stored in a Voronoi diagram layer L62.

In the clustering processing section 64, processing for clustering Voronoi cells of the Voronoi diagram G62 via hierarchical clustering and providing arbitrary cluster numbers D64 to respective clusters is performed using elements (coordinates, standing tree density, etc.) of the Voronoi diagram G62, which are stored in the Voronoi diagram layer L62. Then, the cluster numbers D64 are spatially joined to the single tree data and then stored in the estimation equation creation single tree data set D6X.

As illustrated in FIG. 16, the estimation equation creation single tree data set D6X is provided to the breast height diameter estimation processing section 65 and estimated breast height diameter information D65 is obtained. In the tree volume calculation processing section 70, tree volume calculation processing is performed using the estimated breast height diameter information D65 and tree volume information D70 is thereby generated. The respective generated forest resource information pieces obtained by the present forest resource information generation structure are subjected to aggregate processing by the forest resource information aggregate processing section 80 and a forest resource information set D80 is thereby obtained. Note that the forest resource information generation structure described with reference to FIGS. 14 to 16 will also be described in detail later in the embodiment (see, for example, FIGS. 38, 39, 40 and 41).

Figure 17:
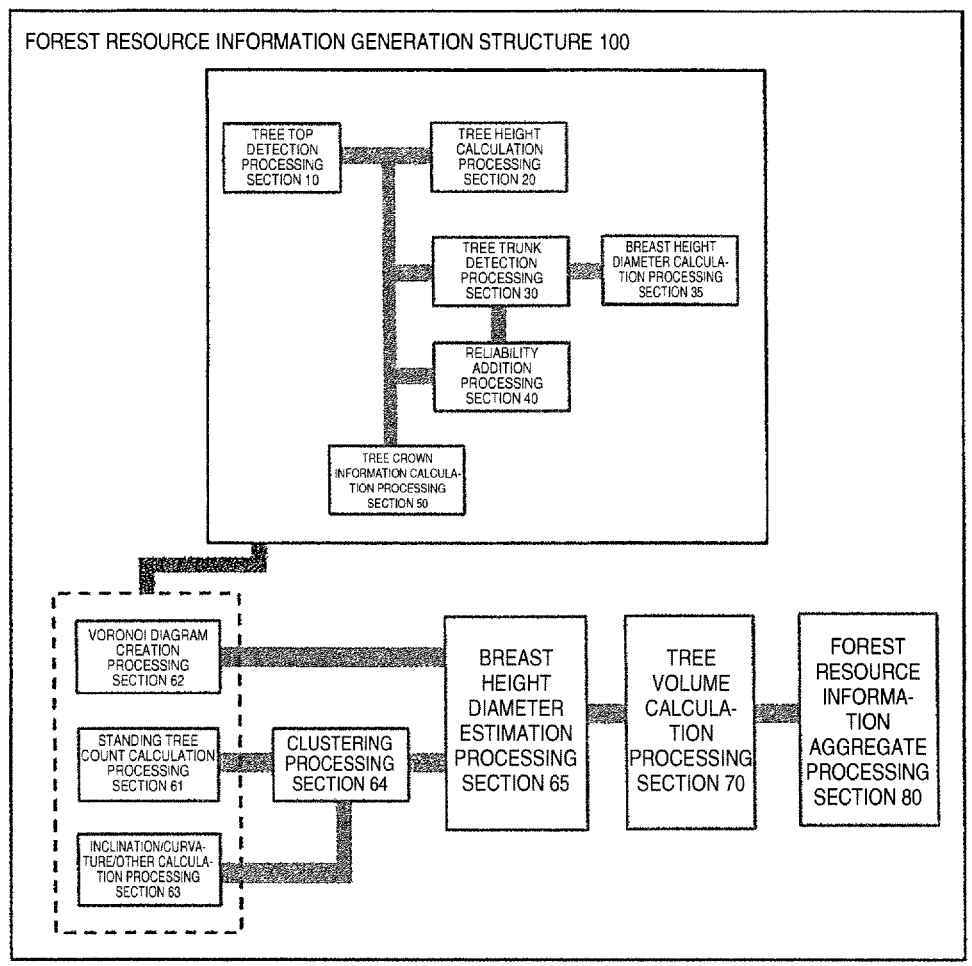
FIG. 17 is a diagram conceptually illustrating a configuration of a forest resource information generation structure of the present invention including all components (respective processing sections)

FIG. 17 is a diagram conceptually illustrating a forest resource information generation structure of the present invention including all of the components (respective processing sections) in the respective forms described above. In the figure, the present forest resource information generation structure 100 is configured by functional sections that generate basic forest resource information, which are generally illustrated in the upper part and functional sections that mainly obtain estimated breast height diameter information based on the generated forest resource information, which are illustrated in the lower part. The entirety of the forest resource information generation structure 100 can be configured as an apparatus set using a computer.

Figure 18:
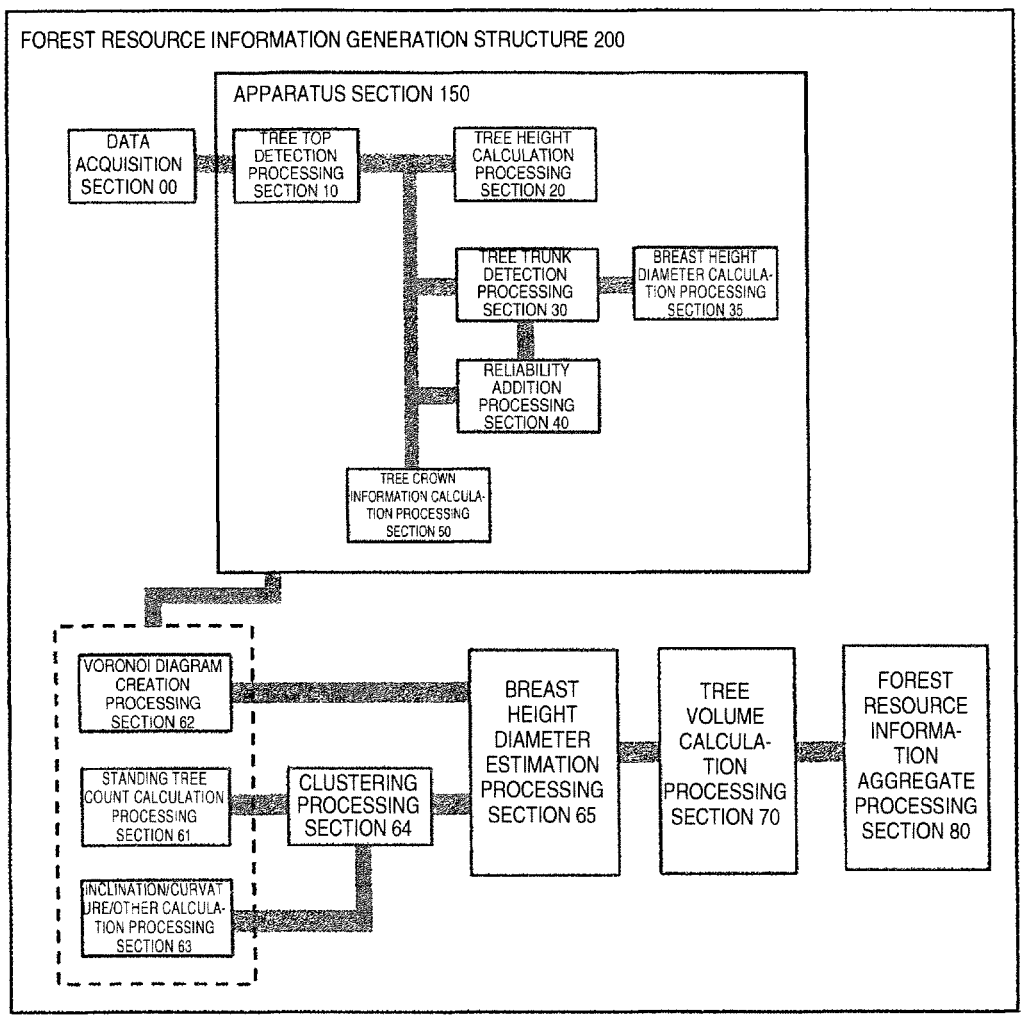
FIG. 18 is a diagram conceptually illustrating a configuration of a forest resource information generation structure of the present invention including a data acquisition section in addition to the configuration illustrated in FIG. 17.

FIG. 18 is a diagram conceptually illustrating a configuration of a forest resource information generation structure of the present invention including a data acquisition section in addition to the configuration illustrated in FIG. 17. The forest resource information generation structure 200 is configured by an apparatus section 150 having a configuration that is the same as that of the forest resource information generation structure 100 illustrated in FIG. 17, and a data acquisition section 00. The data acquisition section 00 illustrates data acquisition means for acquiring point cloud data D00, such as an UAV, a UAV-mounted laser scanner or a ground laser scanner, which is separate from the apparatus section 150. In other words, the present forest resource information generation structure 200 is a forest resource information generation system including the apparatus section 150 and the data acquisition section 00 and the present configuration also falls within the scope of the present invention.

Any of the respective forms of the forest resource information generation structure 100 of the present invention, which have been described with reference to FIGS. 1 to 17, may take a form of a computer program, that is, may be a forest resource information generation program. In this case, the respective processing sections forming the present forest resource information generation structure 100 are steps for generating forest resource information, and the forest resource information generation program makes a computer execute the steps, enabling generation of desired forest resource information. An electronic information medium or an apparatus with the forest resource information generation program stored therein also falls within the scope of the present invention.

Also, a forest resource information generation method for generating forest resource information via any of the forms of the forest resource information generation structure 100 or the like of the present invention, which have been described above, the method being executed by making the respective processing sections included in the forest resource information generation structure operate simultaneously or in an appropriate order, also falls within the scope of the present invention.

In the forest resource information generation method of the present invention, a reliability addition processing section 40 for evaluating reliability of breast height diameter information D35 generated in the breast height diameter calculation processing section 35 is included in the forest resource information generation structure 100, and in the reliability addition processing section 40, reliability information D40 for evaluation of whether or not breast height diameter information has reliability, the reliability information D40 being determined according to comparison between breast height part information D30 in a two-dimensional form and the breast height diameter information D35 generated in the breast height diameter calculation processing section 35, is added to the breast height diameter information D35, and the comparison is made through visual determination by a user of the forest resource information generation structure 100.

Here, in the comparison made through visual determination by the user, a noise removal step of removing data in a point cloud, the data being determined as noise, can be provided in the present forest resource information generation method. Then, based on the data group subjected to the noise removal, the step of tree trunk detection processing may be performed again. Performing the noise removal step and the tree trunk re-detection processing step enables enhancement in accuracy of obtained generated forest information.

In the forest resource information generation method of the present invention can also include a step of acquiring point cloud data. In this case, the point cloud data can be acquired via a UAV, and the UAV may be made to fly at a height above ground level of no less than 40 m but no more than 100 m, desirably around 80 m. Also, a UAV laser irradiation angle can be made up to 80°, but is more preferably no more than ±60°.

With laser measurement from an aircraft, which has conventionally been performed, a tree trunk cannot directly be measured. However, a tree trunk can be captured in a favorable manner by making a UAV-mounted laser scanner fly at a certain height above ground level range and using data of a certain irradiation angle range.

As already described, a diameter of a part at around a breast height can be measured by creating a two-dimensional circular or arc distribution through deletion of Z-coordinates from an obtained point cloud of a tree trunk. Then, based on data of individuals with respective breast height diameters measured with good accuracy, a breast height diameter estimation equation is created by, for example, a generalized linear mixed model, enabling estimation of breast height diameters in an entire forest stand.

Figure 19A:
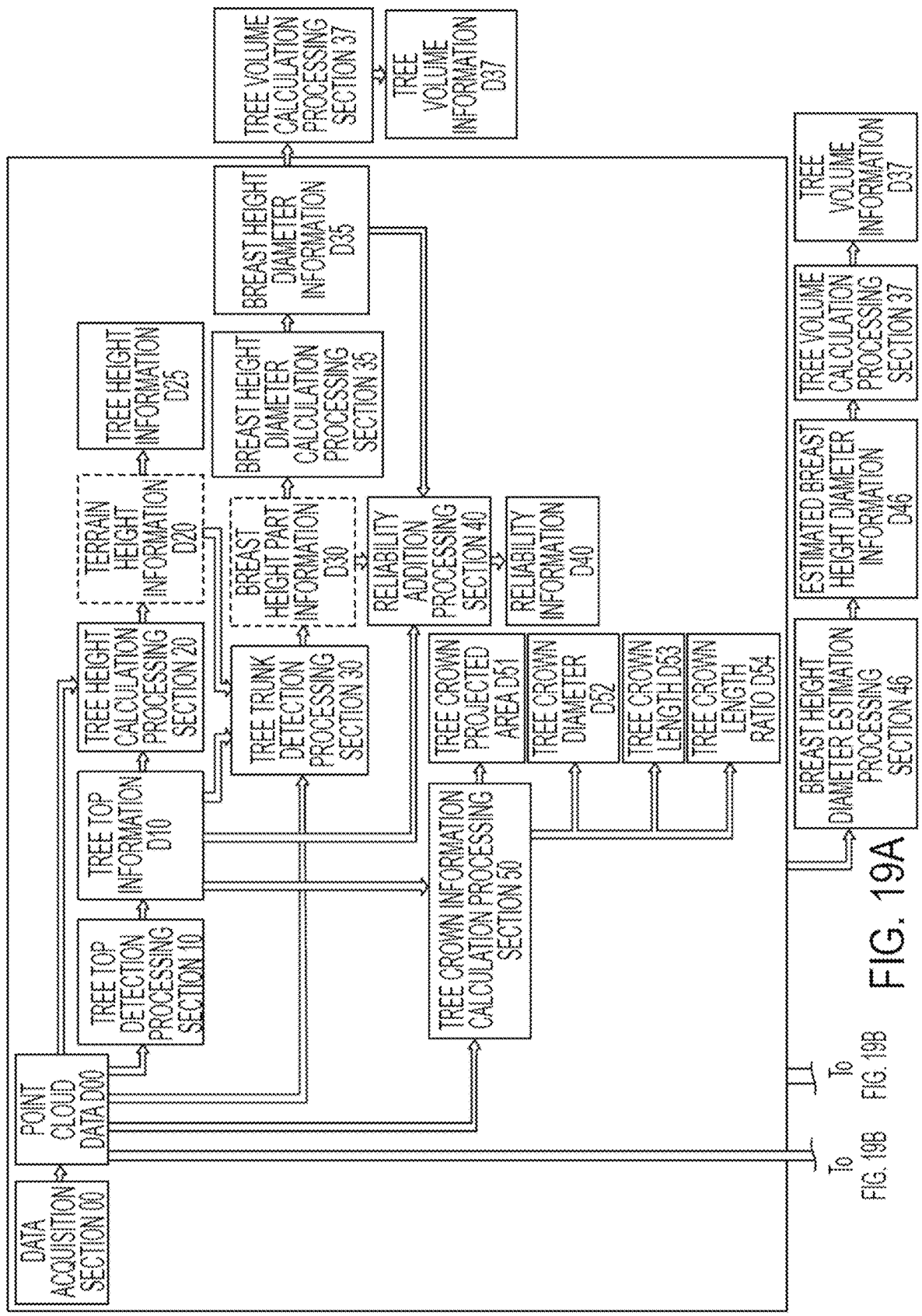
Figure 19B:
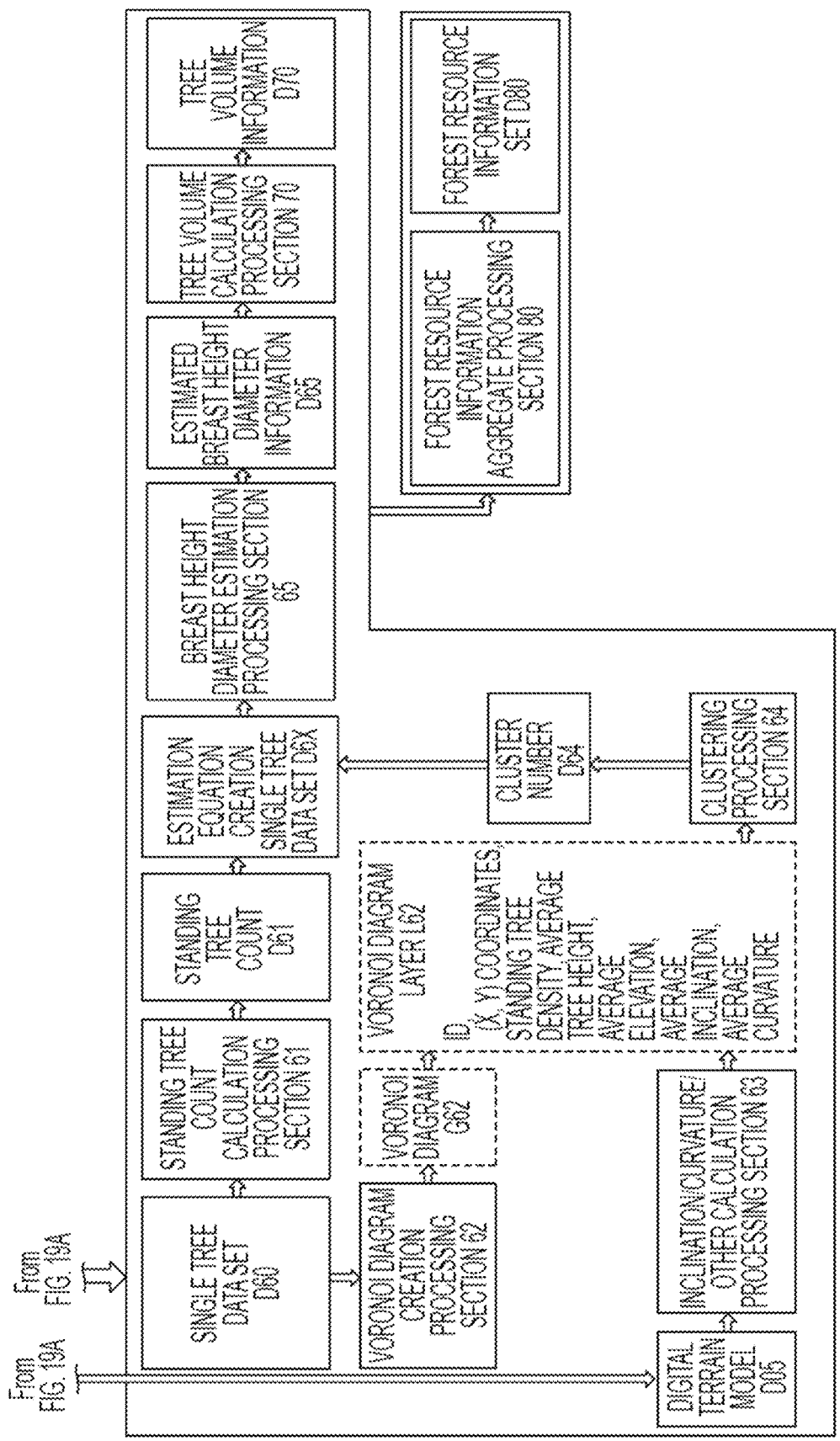

FIGS. 19A and B are first and second portions of a flow chart is a diagram illustrating a forest resource information generation method using a forest resource information generation structure of the present invention including all of the components (processing sections) in the respective forms described above. The labels "To FIG. 19B" in FIG. 19A and "From FIG. 19A" in FIG. 19B indicate where the first and second portions of the flow chart connect.

Embodiment

An embodiment of the present invention will be described below; however, the present invention is not limited to the embodiment. The present embodiment will be described with the present forest resource information generation structure in the form of an apparatus and a forest resource information generation method using the apparatus, as a "forest resource information calculation method". Note that for each of individual information pieces obtained, the last word "information (piece)" is omitted as a general rule like "tree top information" is referred to as "tree top" and "breast height diameter information" is referred to as "breast height diameter".

<<Forest Resource Information Calculation Method>>

FIG. 20 is a flowchart of a forest resource information calculation method of the present embodiment. The respective processing indicated in the present flow will be described in detail later.

<Processing Content Overview>

Forest resource information such as a tree top, a tree height and a tree diameter is detected from point cloud data of a forest, the point cloud data being acquired via a drone laser or point cloud data created from a SfM multi-view point stereoscopic photograph using a drone, and point cloud data acquired via a ground laser in the forest.

<Processing Content Detail 1: Tree Top Detection>
1. Create a mesh using an assumed tree crown diameter and acquire a highest point in each mesh element.
2. Set a virtual detection range with the acquired highest point as a center, the virtual detection range having a size that is the same as that of the mesh element, and acquire a highest point again in the virtual detection range (FIG. 21).
3. If there is a valley between the highest point and the newly acquired highest point, the detection range is changed in such a manner as to extend up to the valley (FIG. 23). Note that this processing is an option.
4. Repeat the processing in the above "2" onwards until the highest point converges (the highest point no longer changes).
5. Delete overlapping points by performing the processing in "1" to "4" above for all of the mesh elements.
6. For each of all the detected highest points, delete points that are lower than the highest point and located within the assumed tree crown diameter and points that are located within a top angle assumed from a species of the relevant tree and located within a range that is double the assumed tree crown diameter (FIG. 25).

FIG. 22 illustrates an example of an actual detection result according to the method illustrated in FIG. 21. In the figure, dark orange indicate high points and blue points are highest points. The figure is one as viewed from directly above. Here, in the center mesh element in the figure, no highest point is detected and a highest point is detected in the right-hand neighbor mesh element. When this point is made to converge, finally, the same point is detected in the right-hand neighbor mesh element, and thus, one of the points is regarded as an overlapping point and deleted.

FIG. 24 illustrates an example of an actual detection result according to the method illustrated in FIG. 23. In the center mesh element in the figure, no highest point is detected, and as convergence proceeds, a highest point is detected in a mesh element below the center mesh element; however, since there is a valley in a vicinity that is continuous with the highest point, the highest point is not a highest point in the lower center mesh element. In highest point detection for the lower center mesh element, a different point is detected, and as a result, two tops are detected in this mesh element. Therefore, for either of the highest points, a detection range that extends up to the valley is employed.

FIG. 26 illustrates an example of an actual detection result according to the method illustrated in FIG. 25. In the figure, dark orange indicates high points and blue points are highest points, and the figure is one as viewed obliquely from the upper near side. Low points detected in the vicinity of a top detected are points to be deleted. Note that several detected points on the lower side in the figure are located much on the near side and are distant from the detected tree top, and thus are not points to be deleted.

<Processing Content Detail 2: Tree Height Detection>
1. Extract data on a lowermost layer in the point cloud acquired from a drone or a ground laser to form a terrain.
2. Acquire three neighbor points that enables creation of a TIN including X, Y-coordinates of a tree top (FIG. 27) and calculate a terrain height at a position of the tree top.
3. Obtain a value resulting from subtraction of the terrain height from a Z-coordinate of the tree top as a tree height (FIG. 29).

FIG. 28 is a diagram illustrating an example of an actual detection result according to the method in FIG. 27 and the diagram is one as viewed from directly above. As illustrated in the figure, three points close to coordinates of a tree top are acquired and a ground height at a position of the tree top is calculated.

<Processing Content Detail 3: Tree Trunk Detection and Breast Height Diameter Calculation>
1. In the point cloud (FIG. 30) acquired from a drone or a ground laser, set a detection range with X and Y-coordinates of a tree top as a center and acquire a point cloud in a part at around a breast height with the terrain reflected (FIG. 31). This is tree trunk detection processing, enabling obtainment of breast height part information (breast height part tree trunk) (FIG. 32).
2. Delete Z-coordinates from the acquired point cloud to create a two-dimensional circular or arc distribution.
3. Calculate a tree diameter by drawing a straight line with a point (A) farthest from a center point and a point (B) farthest from the point (A) as end points, setting a point farthest from a midpoint (C) of the straight line, the point extending perpendicularly, or a point closest to the midpoint as a third point (D), and setting a distance to a virtual center point (O) as a radius r (FIG. 33). According to the above, a breast height diameter is obtained.

A supplement to the tree diameter method illustrated in FIG. 33 (breast height diameter) will be provided. When O is the virtual center point (tree top) and the radius r=OD=OA, from $(r-CD)^2+AC=r^2$ $r=(CD^2+AC^2)/2CD$ can be derived, and thus, the radius r can be calculated and the tree diameter (breast height diameter) can be obtained by $2r$. Note that where point D cannot be found within a proper range, a point closest to point C may be used instead.

<Processing Content Detail 4: Breast Height Diameter Reliability Addition and Noise Removal>

The point clouds cut out for tree diameter (breast height diameter) detection (processing content detail 3) and tree diameters for the tree tops automatically detected by the tree top detection processing (processing content detail 1) are displayed in such a manner as to be superimposed on each other (FIG. 34) and whether or not there is erroneous detection and a degree of the erroneous detection are visually determined.

In the case of erroneous detection due to noise, points that can be considered as noise are manually deleted from the point cloud and the tree diameters are automatically detected again (see processing content detail 3). Point clouds that have only a small amount of information of points or do not enable correct detection of a tree diameter part are determined as having no reliability, and point clouds that have a certain amount of points but do not enable correct calculation are determined as having low reliability. Determination results may be quantified, for example, in such a manner that "high reliability is 2, low reliability is 1 and no reliability is 0".

In FIG. 34, gray points indicate the point clouds at around the breast height, the point clouds being cut out for tree diameter detection, red points indicate tree tops and green circles indicate tree diameters automatically detected for the respective tree tops. Those that have low reliability or no reliability may be determined as noise and removed and the processing in processing content detail 3 above may be performed again.

<Processing Content Detail 5: Tree Crown Information Calculation (Tree Crown Detection)>

1. Cut out a point cloud for a range of assumed tree crown diameter by an arbitrary angle range in a 360° direction with a tree top as a center. This is processing for forming an "angular sector".
2. If there is no other top in the direction of the point cloud cutout, set the range of the assumed tree crown diameter as a detection range for tree trunk detection. If there is another top in the direction of the point cloud cutout, specify an intermediate point between the tree top (relevant top) set as a center and the other top and set the intermediate point as a limit of the detection range (FIG. 35). Note that the intermediate point between the relevant top and the other top can be calculated according to a tree height ratio between the relevant top and the other top. In FIG. 35, the range indicated by a yellow dashed line is an area specified as a tree crown detection range. Also, each of sectors sectioned by a certain angle is an angular sector.
3. Further section the detection angle range with an arbitrarily designated resolution and search for a highest point in each of the resulting ranges (FIG. 36). Although each of the sections formed in the present processing is a "resolution sub-sector", "resolution sub-sector" may be simply referred as "resolution" in the below. In FIG. 36, which is a diagram as viewed directly from a side, each of sections parted by vertical lines is a resolution sub-sector (resolution).
4. Determine a position immediately preceding an angle of an inclination of connected highest points in the respective resolutions consecutively decreasing to be smaller than a designated angle for detection of smoothness or a position immediately preceding inversion of the inclination (change in sign of the inclination), as an end point of the tree crown in the relevant angle range (FIG. 36). Also, if there is no further point in the range, determine a final position at which a point has been detected, as an end point in the relevant resolution.
5. Perform the processing in 3 and 4 above for each of the detection ranges corresponding to 360° to determine an outer circumference of the tree crown.
6. Perform correction of a point projecting relative to neighbor points on opposite sides and correction to remove an excessively depressed point in the outer circumference to determine a final tree crown. Note that if a certain end point projects relative to neighbor end points on the opposite sides, a value of the certain end point only needs to be modified in such a manner as to become an average of distances to the neighbor end points on the opposite sides (FIG. 37).

<Processing Content Detail 6: Breast Height Diameter Estimation>

6-1 Date Set Creation

1. Create a Voronoi diagram covering a target forest stand using data with high breast height diameter reliability from single tree data including individual number, X-coordinate, Y-coordinate, Z-coordinate, tree height, breast height diameter, tree crown projected area, tree crown diameter, tree crown length, tree crown length ratio and breast height diameter reliability (FIG. 38). At this time, each of Voronoi cells of the Voronoi diagram is assigned with an ID. Note that each open circle in the figure indicate data with high breast height diameter reliability.
2. Clip the Voronoi diagram at a forest stand boundary.
3. For each of the Voronoi cells of the Voronoi diagram, calculate a standing tree density Bsr from the count of standing trees in the Voronoi cell and the area of the Voronoi cell and stores the standing tree density Bsr on a Voronoi diagram layer.
4. Create an inclination and curvature layer from a DTM obtained by laser measurement.
5. For each of the Voronoi cells of the Voronoi diagram, calculate respective average values of elevations, inclinations and curvatures within the range of the Voronoi cell from the DTM and the inclination and curvature layer and store the average values on the Voronoi diagram layer.
6. Cluster the Voronoi cells of the Voronoi diagram via hierarchical clustering using the IDs, the X-coordinates, the Y-coordinates, the standing tree densities Bsr, the average elevations, the average inclinations and the average curvatures of the Voronoi cells of the Voronoi diagram, which are stored on the Voronoi diagram layer, and provide an arbitrary number Cid to each cluster (FIG. 39).

7. Spatially join the cluster numbers Cid to the single tree data.
8. Measure a standing tree count Bn of standing trees included within a circle having a radius of 3 to 10 m with each single tree as a center and store the standing tree counts Bn in the single tree data (FIG. 40).

6-2 Creation of Estimation Equation
1. Perform selection of explanatory variables and parameter estimation for an estimation equation for a breast height diameter via a statistical method using data with high reliability in the single tree data.
2. For the explanatory variable selection and the parameter estimation, create a generalized linear mixed model according to the following:

response variable: breast height diameter,
explanatory variables: tree height, tree crown projected area or tree crown diameter, tree crown length or tree crown length ratio, and standing tree count Bn within a radius of 3 to 10 m
random effects: cluster identification number Cid ID, X-coordinate, Y-coordinate, standing tree density Bsr, average tree height, average elevation, average inclination, average curvature A plurality of combinations of analyses were created and respective cluster numbers were stored on the Voronoi diagram layer. Table 1 indicates attribute data of the Voronoi diagram layer (excerpt).

(2) Combinations of Analyses
Cid1: X-coordinate, Y-coordinate, average elevation
Cid2: X-coordinate, Y-coordinate, average inclination
Cid3: X-coordinate, Y-coordinate, average curvature
Cid4: X-coordinate, Y-coordinate, standing tree density
Cid5: X-coordinate, Y-coordinate, average tree height
Cid6: standing tree density, average tree height, average elevation
Cid7: standing tree density, average tree height, average inclination
Cid8: standing tree density, average tree height, average curvature

TABLE 1

Attribute data of Voronoi diagram layer (excerpt)

| ID | X coordinate | Y coordinate | standing tree density | average tree height | average elevation | average inclination | average curvature | Cid1 | Cid2 | Cid3 | Cid4 | Cid5 | Cid6 | Cid7 | Cid8 |
|---|---|---|---|---|---|---|---|---|---|---|---|---|---|---|---|
| 39 | 10270.229 | 100140.425 | 1203.46 | 19.90 | 115.91 | 12.85 | 0.005011 | 1 | 1 | 1 | 1 | 1 | 1 | 1 | 1 |
| 50 | 10303.133 | 100155.914 | 1296.37 | 18.59 | 109.06 | 22.22 | 0.006039 | 1 | 1 | 2 | 1 | 1 | 1 | 1 | 2 |
| 44 | 10278.312 | 100159.622 | 1249.14 | 18.94 | 111.70 | 16.05 | 0.005493 | 1 | 1 | 2 | 1 | 1 | 1 | 1 | 1 |
| 48 | 10289.258 | 100144.992 | 1336.61 | 18.42 | 115.74 | 11.00 | 0.009609 | 1 | 1 | 1 | 1 | 1 | 1 | 1 | 1 |
| 45 | 10280.858 | 100135.819 | 1296.32 | 18.93 | 117.47 | 9.52 | 0.005346 | 1 | 1 | 1 | 1 | 1 | 1 | 1 | 1 |
| 47 | 10288.48 | 100137.512 | 1653.12 | 19.46 | 117.44 | 5.99 | 0.00463 | 1 | 1 | 1 | 1 | 1 | 1 | 1 | 1 |
| 16 | 10232.144 | 100169.631 | 1474.30 | 22.53 | 117.61 | 17.88 | 0.006305 | 2 | 2 | 3 | 2 | 2 | 2 | 1 | 2 |
| 41 | 10271.207 | 100153.552 | 1078.75 | 20.53 | 113.21 | 12.45 | −0.00233 | 1 | 1 | 1 | 1 | 1 | 1 | 2 | 1 |
| 8 | 10213.577 | 100225.132 | 1444.95 | 21.56 | 115.84 | 21.94 | 0.00489 | 2 | 2 | 3 | 2 | 3 | 2 | 1 | 2 |
| 43 | 10272.096 | 100170.158 | 878.56 | 19.61 | 108.83 | 17.35 | 0.004225 | 1 | 1 | 2 | 3 | 1 | 1 | 2 | 1 |

An optimum model can be selected from the number of explanatory variables and an Akaike information criterion value (AIC value).

6-3 Estimated Value Calculation

Estimate a breast height diameter for data with low reliability from the explanatory variables and parameters of the selected model and store the estimated breast height diameter in the single tree data. FIG. 41 illustrates a list of single tree data items that are individual number, X-coordinate, Y-coordinate, tree height, breast height diameter, tree crown projected area, tree crown diameter, tree crown length, tree crown length ratio, breast height diameter accuracy (reliability), cluster number and estimated breast height diameter.

For the tree volume calculation processing and the forest resource information aggregate processing, known methods can appropriately be used.

The below supplements relate to actual examples of clustering of Voronoi cells of a Voronoi diagram and estimation equation creation and estimation value calculation.

<Supplement 1: Actual example of clustering of Voronoi cells of a Voronoi diagram>

(1) Conditions
Survey site: cedar forest stand (1.5 ha)
Detected tree top count: 1, 476
Count of trees with reliability 1 and trees with reliability 2: 78
Data stored on a Voronoi diagram layer (data to be standardized and used for analysis):

<Supplement 2: Actual Example of Estimation Equation Creation and Estimated Value Calculation>

(1) Conditions
Survey site: cedar forest stand (1.5 ha)
Detected tree top count: 1,476
Count of trees with breast height diameter reliability 1 or 2: 78

It is desirable that the count of trees with reliability 1 or 2 constitute at least no less than 5% of the detected tree top count. Here, reliability 1 and reliability 2 indicate that there is reliability and reliability 0 indicates that there is no reliability.

Data stored in single tree data:
Individual number, X-coordinate, Y-coordinate, Z-coordinate, tree height, breast height diameter, tree crown projected area, tree crown diameter, tree crown length, tree crown length ratio, breast height diameter reliability, cluster numbers Cid1 to Cid 8 and standing tree count Bn within a radius of 5 m A plurality of combinations of variables according to a generalized linear mixed model were created, a maximum likelihood estimate was calculated and an optimum model was selected from the number of explanatory variables and an Akaike information criterion value (AIC value).

Error structure: gamma distribution

A probability density function is indicated in Expression (1).

[Expression 1]

$$p(y \mid s, r) = \frac{r^s}{\Gamma(s)} y^{s-1} \exp(-ry)$$

$(y > 0)$

Expression (1)

In Expression (1), s is a shape parameter and r is a scale parameter.

Link function: logarithmic function

A linear predictor is indicated in Expression (2).

$$\mu_i = \exp(a + b \log_{xi})$$

Expression (2)

(2) Combinations of Variables model1: explanatory variable (tree height), random effects (tree height|cluster number Cid1)

model2: explanatory variables (tree height, tree crown projected area), random effects (tree crown projected area|cluster number Cid1)

model3: explanatory variables (tree height, tree crown projected area, standing tree count Bn), random effects (standing tree count Bn|cluster number Cid1)

model4: explanatory variables (tree height, tree crown projected area, tree crown length), random effects (tree crown projected area|cluster number Cid1)

model5: explanatory variables (tree height, tree crown projected area, tree crown length, standing tree count Bn), random effects (standing tree count Bn | cluster number Cid1)

(3) Model Selection

The plurality of models created were compared with one another to select a model with a lower AIC value and fewer explanatory variables. Table 2 is a list of the created models, and here, model3 was selected. Note that each chi-square value and each significance probability are those in comparison with those of model1.

TABLE 2

Comparison of models (here, model3 selected)

| Model | Explanatory variables | Degree of flexibility | AIC | BIC | Log likelihood | Deviance | Chi-square value | Significance probability |
|---|---|---|---|---|---|---|---|---|
| model1 | 1 | 6 | 465.92 | 478.28 | −226.96 | 453.92 | | |
| model2 | 2 | 7 | 459.79 | 474.22 | −222.9 | 445.79 | 8.1262 | 0.004363 |
| model3 | 3 | 8 | 457.84 | 474.33 | −220.92 | 441.84 | 3.9513 | 0.046836 |
| model4 | 3 | 8 | 461.66 | 478.14 | −222.83 | 445.66 | 0 | 1 |
| model5 | 4 | 9 | 459.73 | 478.27 | −220.86 | 441.73 | 3.927 | 0.047517 |

Note:
Chi-square value and significance probability are those in comparison with those of model1

(4) Estimation of Breast Height Diameter According to Selected Model

An estimation equation created from a maximum likelihood estimate of model3 (Table 3: Fixed effects and random effects coefficients) is indicated in Expression (3).

TABLE 3

Fixed effects and random effects coefficients

| Fixed effects | Coefficient | Standard error | t value | Significance probability | Random effects | Intercept | Standing tree count Bn |
|---|---|---|---|---|---|---|---|
| Intercept | 3.55463 | 0.4138 | 8.59 | <2e−16 | Cluster 1 | −0.14994 | −0.00204947 |
| Tree height | 0.01378 | 0.01449 | 0.951 | 0.3416 | Cluster 2 | 0.049255 | −0.00073415 |
| Standing tree count Bn | −0.04367 | 0.0188 | −2.322 | 0.0202 | Cluster 3 | 0.114538 | 0.002134342 |
| Tree crown projected area | 0.02913 | 0.01433 | 2.033 | 0.0421 | Cluster 4 | 0.092527 | 0.003243394 |

Breast height diameter=exp((3.55463+random
  effects: intercept)+0.01378*tree height+(−
  0.04367+random effects: standing tree count
  $Bn$)*standing tree count $Bn$+0.02913*tree crown
  projected area)                    Expression (3)

Breast height diameters estimated according to Expression (3) are stored in single tree data as estimated breast height diameters. Table 4 is a single tree data list (excerpt).

TABLE 4

Single tree data list (excerpt)

| Individual number | X coordinate | Y coordinate | Z coordinate | Tree height | Breast height diameter | Tree crown projected area | Tree crown diameter |
|---|---|---|---|---|---|---|---|
| 1  | 10200.62 | 100306.8 | 112.659 | 27.02397 | 230.4242 | 4.344463 | 2.627544 |
| 2  | 10203.79 | 100112.4 | 131     | 28.49219 | 199.5134 | 6.901463 | 3.445643 |
| 3  | 10195.61 | 100131.4 | 136.384 | 25.18106 | 95.66457 | 9.598752 | 3.80625  |
| 4  | 10202.43 | 100199.2 | 146.866 | 27.56943 | 120.7322 | 10.1227  | 4.015378 |
| 5  | 10186.49 | 100130.2 | 138.932 | 24.47487 | 221.7098 | 4.344463 | 2.627544 |
| 6  | 10182.35 | 100113.4 | 140.234 | 23.8112  | 183.1825 | 6.457739 | 3.350869 |
| 7  | 10181.25 | 100211   | 144.842 | 23.73974 | 75.41636 | 6.920252 | 3.414559 |
| 8  | 10178.29 | 100240.2 | 134.197 | 23.18552 | 33.31562 | 5.230159 | 2.797398 |
| 9  | 10192.67 | 100213.8 | 148.123 | 25.175   | 0        | 9.309455 | 4.032446 |
| 10 | 10183.66 | 100193.2 | 145.01  | 24.16437 | 61.24103 | 11.79892 | 4.158607 |
| 11 | 10194.64 | 100246.5 | 132.397 | 26.11924 | 103.3447 | 10.08519 | 3.938083 |
| 12 | 10183.42 | 100168.1 | 140.087 | 24.1405  | 42.68997 | 8.118782 | 3.970264 |
| 13 | 10202.15 | 100143.9 | 136.31  | 27.97074 | 0        | 4.344463 | 2.627544 |
| 14 | 10173.32 | 100211.3 | 145.678 | 22.43564 | 45.11901 | 12.99128 | 4.334904 |
| 15 | 10200.06 | 100138.4 | 138.442 | 27.09489 | 27.09737 | 9.093984 | 3.847748 |
| 16 | 10198.35 | 100159.4 | 141.654 | 26.80719 | 84.71957 | 5.740567 | 3.124322 |
| 17 | 10154.23 | 100199.1 | 143.235 | 19.00545 | 27.41051 | 10.4728  | 4.148182 |
| 18 | 10199.17 | 100217.4 | 135.076 | 26.89207 | 0        | 10.73673 | 4.52756  |

| Individual number | Tree crown length | Tree crown length ratio | Breast height diameter reliability | Cluster number Cid1 | Standing tree count | Estimated breast height diameter |
|---|---|---|---|---|---|---|
| 1  | 7.887  | 0.278 | 0 | 4  | 6  | 49.57774 |
| 2  | 14.446 | 0.574 | 0 | 2  | 6  | 50.96415 |
| 3  | 7.229  | 0.266 | 0 | 2  | 7  | 51.08255 |
| 4  | 11.162 | 0.411 | 0 | 1  | 6  | 44.93235 |
| 5  | 7.887  | 0.278 | 0 | 4  | 4  | 51.8974  |
| 6  | 5.392  | 0.229 | 0 | 3  | 9  | 45.22181 |
| 7  | 13.104 | 0.572 | 0 | 2  | 11 | 38.25064 |
| 8  | 5.857  | 0.25  | 0 | 2  | 9  | 39.49204 |
| 9  | 13.685 | 0.575 | 0 | 1  | 4  | 46.52136 |
| 10 | 8.45   | 0.329 | 0 | 4  | 8  | 54.62173 |
| 11 | 10.01  | 0.386 | 0 | 3  | 7  | 56.38049 |
| 12 | 16.502 | 0.678 | 1 | 1  | 8  | 36.89566 |
| 13 | 7.887  | 0.278 | 0 | 4  | 11 | 41.03623 |
| 14 | 10.826 | 0.383 | 0 | 3  | 7  | 58.32423 |
| 15 | 15.508 | 0.614 | 0 | 1  | 5  | 45.34825 |
| 16 | 7.742  | 0.332 | 0 | 4  | 9  | 45.60163 |
| 17 | 19.246 | 0.777 | 0 | 1  | 10 | 33.598   |
| 18 | 14.523 | 0.563 | 0 | 2  | 7  | 53.32418 |

A forest resource information generation structure and a forest resource information generation method according to the present invention enable, based on a point cloud data set obtained with no need for an actual measurement data collection process, generating and acquiring various forest resource information pieces including a breast height diameter necessary for calculation of a tree volume, which is important information, as single tree data, and further as information of an entire forest stand, efficiently and accurately relative to the conventional techniques. Therefore, the present invention is an invention having high industrial applicability in the forestry industry and all related industries.

What is claimed is:

1. A forest resource information generation structure for generating forest resource information using point cloud data of forest resources, the point cloud data being acquired via a remote sensing technique, the structure comprising:
    a tree top detection processing section for obtaining tree top information, and
    a breast height diameter calculation processing section for obtaining breast height diameter information, the structure further comprising:
    a tree trunk detection processing section for obtaining breast height part information based on terrain height information obtained from the point cloud data and the tree top information,
    wherein the breast height diameter information is generated by the breast height part information being subjected to processing in the breast height diameter calculation processing section; and
    wherein the forest resource information generation structure further comprises a breast height diameter reliability addition processing section for evaluating reliability of the breast height diameter information generated in the breast height diameter calculation processing section, wherein in the reliability addition processing section, reliability information for evaluation of whether or not the breast height diameter information has reliability, the reliability information being determined according to comparison between the breast height part information in a two-dimensional form and the breast height diameter information generated by the breast height diameter calculation processing section, is added to the breast height diameter information.

2. The forest resource information generation structure according to claim 1, wherein in the tree trunk detection processing section, a detection range with the tree top information as a center is set, and in the detection range, a point cloud in a part at around a breast height with the terrain height information reflected is acquired as the breast height part information.

3. The forest resource information generation structure according to claim 2, wherein in the breast height diameter calculation processing section, a substantially arc or substantially circular two-dimensional distribution with a Z-coordinate removed from the acquired breast height part information is created, and the breast height diameter information is generated by a radius of the two-dimensional distribution being calculated according to a predetermined method.

4. The forest resource information generation structure according to claim 3, wherein the calculation according to the predetermined method is calculation according to properties of chords and Pythagorean's theorem.

5. The forest resource information generation structure according to claim 1, wherein in the tree top detection processing section, the tree top information is obtained from the point cloud data using a planar structure in which units of the detection range, the units having a same shape and a same size defining mesh element(s), are consecutively provided to define a mesh structure and for each mesh element, processing for determining highest point data of a highest point converged through repetition of <A1> and <A2> below, as the tree top information is performed:
    <A1> extract highest point data whose Z-coordinate is largest in the mesh element; and
    <A2> re-set a detection range having a size that is same as that of the mesh element, with X and Y coordinates of the highest point data as a center.

6. The forest resource information generation structure according to claim 5, wherein in the tree top detection processing section, for the tree top information for each mesh element, processing for removing data whose Z-coordinate is smaller, the data being present around the tree top information, according to a predetermined criterion based on an estimated tree crown diameter value is performed.

7. The forest resource information generation structure according to claim 6, wherein the predetermined criterion includes <B1> and <B2> below:
    <B1> within the estimated tree crown diameter value, delete data whose Z-coordinate is smaller than that of the tree top information; and
    <B2> within a range that is double the estimated tree crown diameter value, delete data present within a top angle estimated from a tree species.

8. The forest resource information generation structure according to claim 5, wherein in the tree top detection processing section, during the repetition of <A1> and <A2>, if there is data whose Z-coordinate has a local minimal value between the highest point data before and after the re-setting of the detection range, processing for sectioning the re-set detection range by the local minimal value is performed.

9. The forest resource information generation structure according to claim 1, comprising a tree height calculation processing section for obtaining the terrain height information from a lowermost layer data of the point cloud data and obtaining tree height information from the terrain height information and the tree top information.

10. The forest resource information generation structure according to claim 9, wherein in the tree height calculation processing section, a triangulated irregular network including X, Y coordinates of the tree top information is created from three points data neighboring the tree top information to obtain the terrain height information, and the tree height information is generated by subtraction of the terrain height information from a Z-coordinate of the tree top information.

11. A forest resource information generation structure for generating forest resource information using point cloud data of forest resources, the point cloud data being acquired via a remote sensing technique, the structure comprising:
    a tree top detection processing section for obtaining tree top information, and
    a breast height diameter calculation processing section for obtaining breast height diameter information, the structure further comprising:
    a tree trunk detection processing section for obtaining breast height part information based on terrain height information obtained from the point cloud data and the tree top information,
    wherein the breast height diameter information is generated by the breast height part information being subjected to processing in the breast height diameter calculation processing section; and
    wherein the forest resource information generation structure further comprises a tree crown information calculation processing section for obtaining tree crown projected area information and other tree crown information, wherein in the tree crown information calculation processing section, processing for extracting a data group for specifying a tree crown with the tree top as a center from the point cloud data, dividing the data group by a predetermined angle into circumferential angular sectors, specifying an end point estimated as an outermost edge of the tree crown in each angular sector and connecting respective end points to determine an outer circumference of the tree crown is performed.

12. The forest resource information generation structure according to claim 11, wherein in the tree crown information calculation processing section, processing for dividing each angular sector in a centrifugal direction with a predetermined resolution into radial sectors and connecting highest point data specified in the respective radial sectors to draw a schematic figure of a side contour of the tree crown and specifying the end point based on a degree of an inclination of a line segment included in the figure is performed.

13. The forest resource information generation structure according to claim 12, wherein the specification of the end point is performed by any of <C1> to <C3> below:
    <C1> if the inclination is smaller than a predetermined angle indicating smoothness through a predetermined number of consecutive line segments, determine a point immediately preceding the line segments as the end point;
    <C2> if a sign of the inclination is inverse through a predetermined number of consecutive line segments, determine a point immediately preceding the line segments as the end point; and <C3> if there is no point in the radial sector, determine a point detected last as the end point.

14. The forest resource information generation structure according to claim 11, wherein if there is a tree top other than a processing target tree top in the data group, processing for determining a boundary between tree crowns according to tree heights of the tree tops is performed.

15. The forest resource information generation structure according to claim 11, wherein processing for correcting the end point for specifying the tree crown using a horizontal distance from the tree top to the end point is performed and the correction is correction in which the horizontal distance for the correction target end point is increased or decreased based on respective end point distances for two points neighboring the correction target on opposite sides.

16. The forest resource information generation structure according to claim 1, comprising a tree volume calculation processing section for calculating tree volume information based on the breast height diameter information.

17. A forest resource information generation structure for generating forest resource information using point cloud data of forest resources, the point cloud data being acquired via a remote sensing technique, the structure comprising:
a tree top detection processing section for obtaining tree top information, and
a breast height diameter calculation processing section for obtaining breast height diameter information, the structure further comprising:
a tree trunk detection processing section for obtaining breast height part information based on terrain height information obtained from the point cloud data and the tree top information,
wherein the breast height diameter information is generated by the breast height part information being subjected to processing in the breast height diameter calculation processing section;
the forest resource information generation further comprising a breast height diameter reliability addition processing section that performs <D1> below in order to evaluate reliability of the breast height diameter information, and a breast height diameter estimation processing section that, for breast height diameter information having no reliability or low reliability, generating estimated breast height diameter information by estimating a breast height diameter based on information generated in the forest resource information generation structure,
<D1> addition of the reliability information for evaluation of whether or not the breast height diameter information has reliability, the reliability information being determined according to comparison between the breast height part information in a two-dimensional form and the breast height diameter information generated in the breast height diameter calculation processing section, to the breast height diameter information.

18. The forest resource information generation structure according to claim 17, comprising a tree volume calculation processing section for calculating tree volume information based on the breast height diameter information or the estimated breast height diameter information.

19. The forest resource information generation structure according to claim 17, wherein processing in the breast height diameter estimation processing section is performed using an information set including the information generated in the forest resource information generation structure and in the information set, cluster numbers generated by Voronoi cells of a Voronoi diagram covering a target forest stand being subjected to clustering processing are spatially joined to the information set, and the forest resource information generation structure includes a Voronoi diagram creation processing section that creates the Voronoi diagram and a clustering processing section that performs the clustering processing.

20. The forest resource information generation structure according to claim 19, wherein a layer of the Voronoi diagram includes information of an inclination and a curvature, the information being created from a digital terrain model obtained based on the point cloud data, and the forest resource information generation structure includes an inclination and other calculation processing section for calculating the inclination and the curvature.

21. The forest resource information generation structure according to claim 1, wherein the point cloud data is acquired via a remote sensing technique for any of <E1>, <E2> and <E3> below:
<E1> acquisition via a measurement technique using an unmanned aerial vehicle or drone-mounted laser scanner;
<E2> acquisition via the unmanned aerial vehicle or drone-mounted laser scanner and a measurement technique using a ground laser scanner; and
<E3> creation from an SfM multi-viewpoint stereoscopic photograph using an unmanned aerial vehicle or drone and acquisition via the ground laser scanner.

22. The forest resource information generation structure according to claim 1, wherein the forest resource information generation structure takes a form of an apparatus and is a forest resource information generation apparatus.

23. The forest resource information generation structure according to claim 1, wherein the forest resource information generation structure takes a form of a system including a data acquisition section for acquiring the point cloud data and is a forest resource information generation system.

24. The forest resource information generation structure according to claim 1, wherein the forest resource information generation structure takes a form of a computer program and is a forest resource information generation program, and the respective processing sections included in the forest resource information generation program are steps for generating forest resource information, and the forest resource information generation program makes a computer execute the steps.

25. A forest resource information generation method for generating forest resource information, said method comprising:
using a forest resource information generation structure comprising: (i) a tree top detection processing section for obtaining tree top information, and (ii) a breast height diameter calculation processing section for obtaining breast height diameter information, (iii) a tree trunk detection processing section for obtaining breast height part information based on terrain height information obtained from the point cloud data and the tree top information, wherein the breast height diameter information is generated by the breast height part information being subjected to processing in the breast height diameter calculation processing section,
wherein the method further comprises making the respective processing sections included in the forest resource information generation structure operate simultaneously or in an appropriate order; and wherein a breast height diameter reliability addition processing section for evaluating reliability of breast height diameter information generated by the breast height diameter calculation processing section is included in the forest resource information generation structure, and in the reliability addition processing section, where reliability information for evaluation of reliability of breast height diameter information generated by the breast height diameter calculation processing section, the reliability information being determined according to comparison between the breast height part information in a two-dimensional form and the breast height diameter information, is added to the breast height diameter information, the comparison is made visually.

26. The forest resource information generation method according to claim 25, wherein a noise removal step of removing data in a point cloud, the data being determined as noise based on the comparison made visually, is provided, and a step of tree trunk detection processing is performed again based on the data group subjected to the noise removal.

27. The forest resource information generation method according to claim 25, wherein the point cloud data is acquired by making an unmanned aerial vehicle or drone fly at a height above ground level of no less than 40 m but no more than 100 m.

28. The forest resource information generation method according to claim 26, wherein the point cloud data is acquired by an unmanned aerial vehicle or drone-mounted laser scanner with an irradiation angle of no more than ±60°.

* * * * *